(12) United States Patent
Matsui et al.

(10) Patent No.: US 7,773,321 B2
(45) Date of Patent: Aug. 10, 2010

(54) LENS UNIT AND IMAGE PICKUP APPARATUS

(75) Inventors: Kazuaki Matsui, Osaka (JP); Yoshifumi Mitani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 79 days.

(21) Appl. No.: 11/901,400

(22) Filed: Sep. 17, 2007

(65) Prior Publication Data
US 2008/0068730 A1    Mar. 20, 2008

(30) Foreign Application Priority Data
Sep. 19, 2006    (JP) .............................. 2006-252494

(51) Int. Cl.
*G02B 7/02*    (2006.01)
*G02B 15/14*   (2006.01)
(52) U.S. Cl. ...................... 359/823; 359/696; 359/813; 359/819
(58) Field of Classification Search ................. 359/819, 359/696, 699, 822–823, 826, 821, 811, 813–815, 359/687–688, 690, 676, 795
See application file for complete search history.

(56) References Cited
U.S. PATENT DOCUMENTS
7,116,488 B2 * 10/2006 Shin et al. .................. 359/687
2006/0098306 A1    5/2006 Yoshitsugu
2006/0285221 A1 * 12/2006 Bito et al. .................. 359/676

FOREIGN PATENT DOCUMENTS
JP    11-119078    4/1999
JP    06-064958    3/2006

* cited by examiner

*Primary Examiner*—Scott J Sugarman
*Assistant Examiner*—Dawayne A Pinkney
(74) *Attorney, Agent, or Firm*—Brinks Hofer Gilson & Lione

(57) ABSTRACT

The present invention provides a lens unit including: a first lens group; a second lens group; an optical-path bending member; a movable frame holding the first lens group; a stationary frame holding the movable frame movably in an direction of the first optical axis, and adopted to telescopically house the movable frame therein; and a bending-member moving mechanism for moving the optical-path bending member. When an image is taken, the movable frame protrudes from the stationary frame and the optical-path bending member is arranged at a position so as to bend the first optical axis in the direction of the second optical axis. When the lens unit retracts, the bending-member moving mechanism moves the optical-path bending member to retreat the optical-path bending member from an area where the first lens group to be housed in the stationary frame.

15 Claims, 20 Drawing Sheets

LENS UNIT AND IMAGE PICKUP APPARATUS

This application is based on Japanese Patent Application No. 2004-252494 filed on Sep. 19, 2006, in Japanese Patent Office, the entire content of which is hereby incorporated by reference.

TECHNICAL FIELD

The present invention relates to a lens unit and an image pickup apparatus.

BACKGROUND

In recent years, along with the popularization of a personal computer, a digital camera through which an image can be captures into the personal computer easily is coming into wide use. Further, incorporating a digital camera in an information processing equipment such as a mobile computer, a cell-phone and a personal digital assistant (PDA: Personal Digital Assistant) is now generalized. With this spread of a digital camera, a digital camera in a smaller size is demanded, and a lens unit to be incorporated in this digital camera in a smaller size is required to be further smaller. For photographing, on the other hand, a high-power zoom lens that is easy-to-use is demanded.

To cope with these demands, there is available an image pickup apparatus equipped with an image pickup means that outputs electric signals in accordance with an amount of incident light, including therein: an optical means that bends an optical path of incident light, for example, a reflecting mirror; a first lens group that is constructed at the object side of the reflecting mirror and is driven such that at least a part of the first lens group is housed in the image pickup apparatus when an image is not taken, and that the first lens group is more protruded toward the object side than its housed condition when an image is taken; and a second lens group constructed at the object side of the image pickup means (See Japanese Patent Publication Open to Public Inspection No. 2006-64958). In the image pickup apparatus, the reflecting mirror moves to a position so as to change the optical path of an optical image of an object entering through the first lens group to the direction of the second lens group when an image is taken, and moves from an area where the first lens group is housed to the position for retreating when an image is not taken. Specifically, the Japanese Patent Publication Open to Public Inspection (JP-A) No. 2006-64958 discloses an image pickup apparatus in which a prism is used as an optical means, and the first lens group and the prism retreat integrally in the direction of a thickness of a camera body before image taking is completed. JP-A No. 2006-64958 further discloses, specifically, an image pickup apparatus in which a prism and a second lens group are moved integrally in the optical axis direction of the second lens group representing a lateral direction of a camera body to make a space of retreating for the first lens group.

However, as for the image pickup apparatus described in JP-A No. 2006-64958, the method to retreat the prism and the first lens group integrally in the thickness direction of a camera boy when an image is not taken, provides difficulty of making a camera body thin in its thickness direction in. Further, the method to make an space for the first lens group to retreat by moving the prism and the second lens group integrally in the lateral direction of a camera body, provides difficulty of making a size of the second lens group small in its optical axis direction because it requires to secure the space by making the second lens group in addition to the prism to be retreated. Further, the structure has a complicated structure because it is necessary to move both of the prism and the second lens group.

SUMMARY

The present invention has been achieved in view of the problems stated above, and its object is to provide a small lens unit with a simple structure which enables to house therein an image taking lens when an image is not taken.

To solve the above problems, there is provided a lens unit comprising: a first lens group arranged on a first optical axis, in which a light flux from an object enters; a second lens group arranged on a second optical axis; an optical-path bending member having a reflection surface for bending the first optical axis in a direction of the second optical axis; a movable frame holding the first lens group, and having a tube shape comprising a side plane parallel to a first plane formed by the first optical axis and the second optical axis; a stationary frame holding the movable frame movably in an direction of the first optical axis, and adopted to telescopically house the movable frame therein; and a bending-member moving mechanism for moving the optical-path bending member. When an image is taken, the movable frame protrudes from the stationary frame and the optical-path bending member is arranged at a position so as to bend the first optical axis in the direction of the second optical axis. When the lens unit retracts, the bending-member moving mechanism moves the optical-path bending member in a direction substantially perpendicular to the first plane to retreat the optical-path bending member from an area where the first lens group to be housed in the stationary frame.

To solve the above problems, there is also provided an image pickup apparatus comprising the above lens unit.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 7:
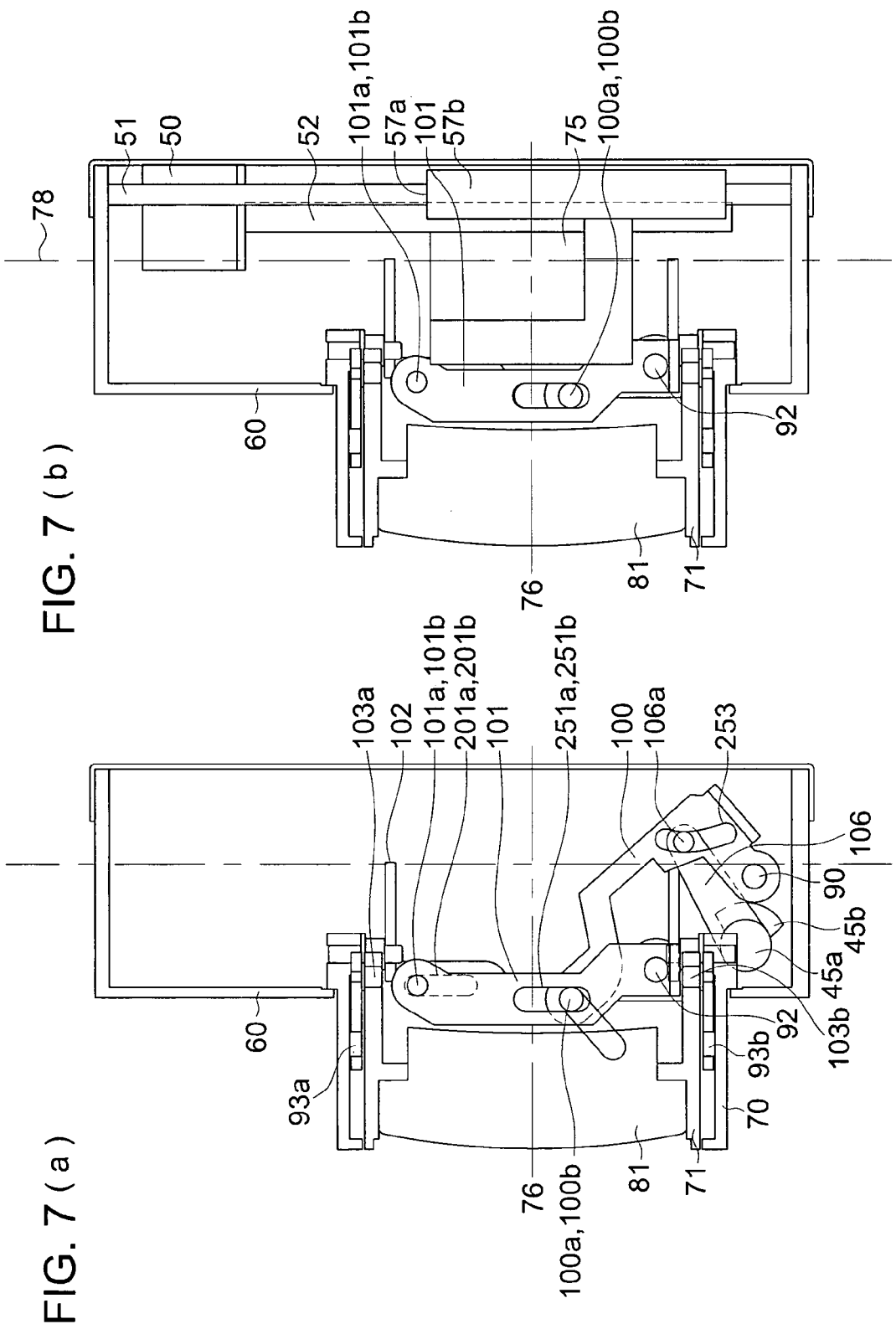
Figure 8:
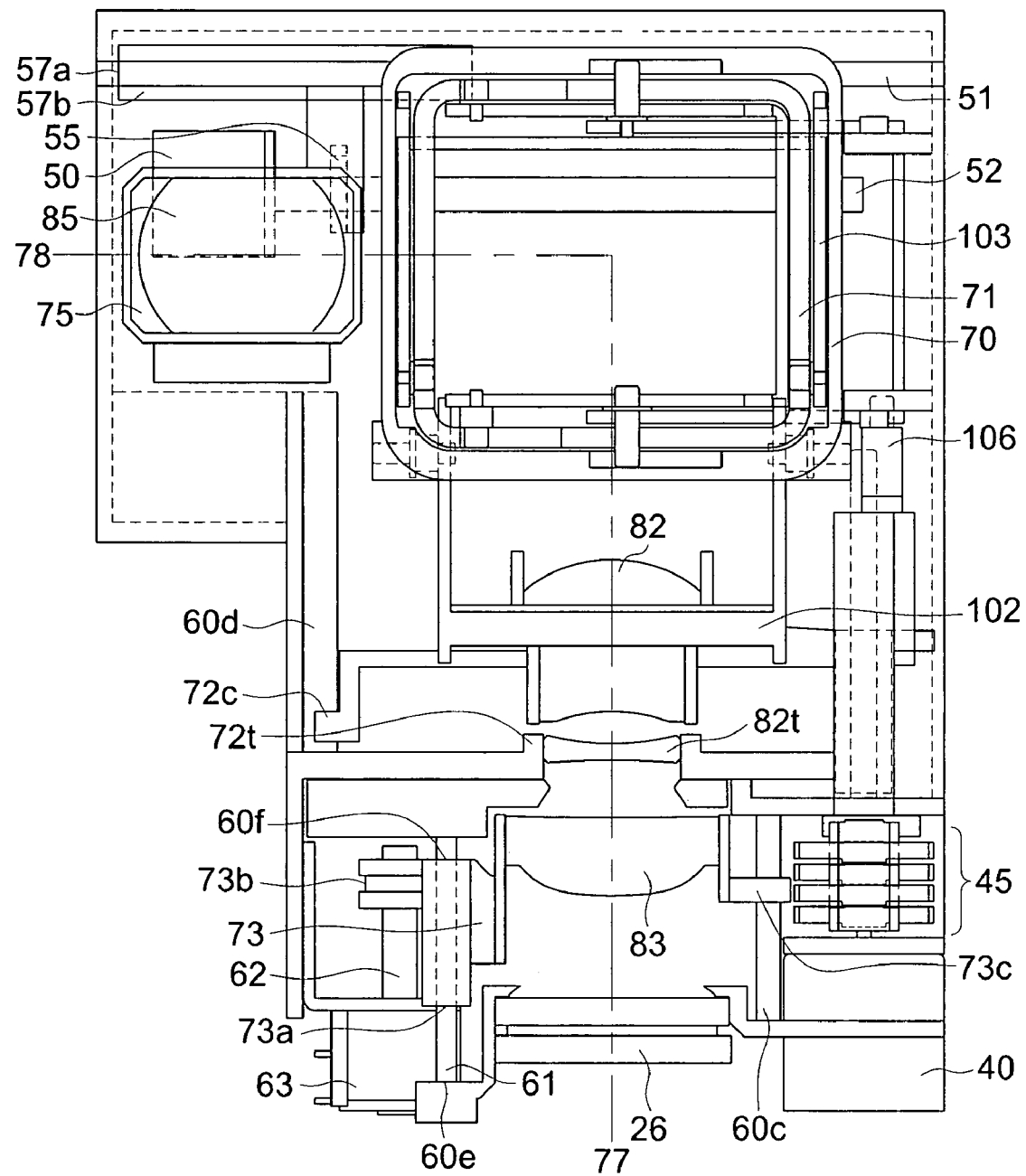
Figure 9:
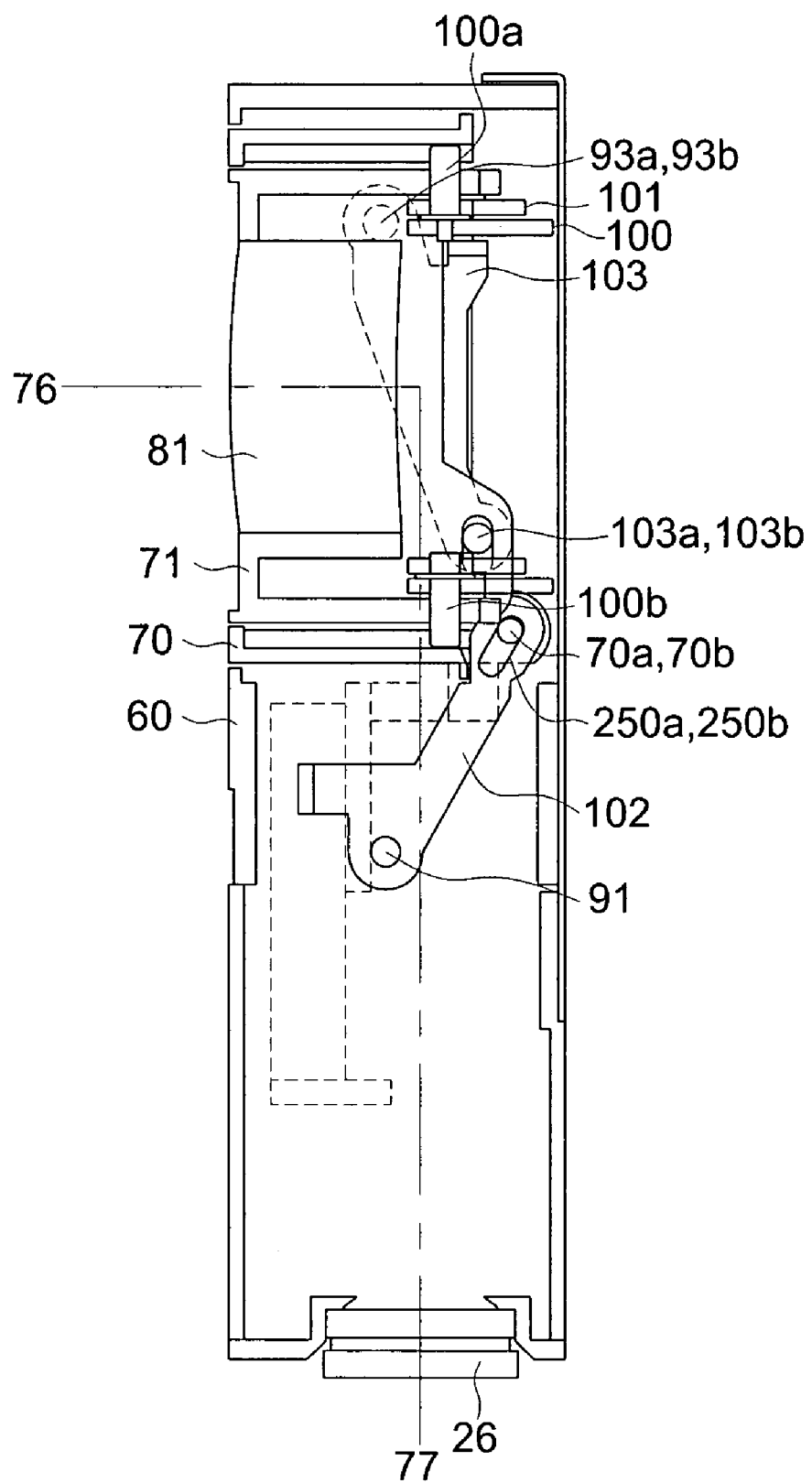
Figure 10:
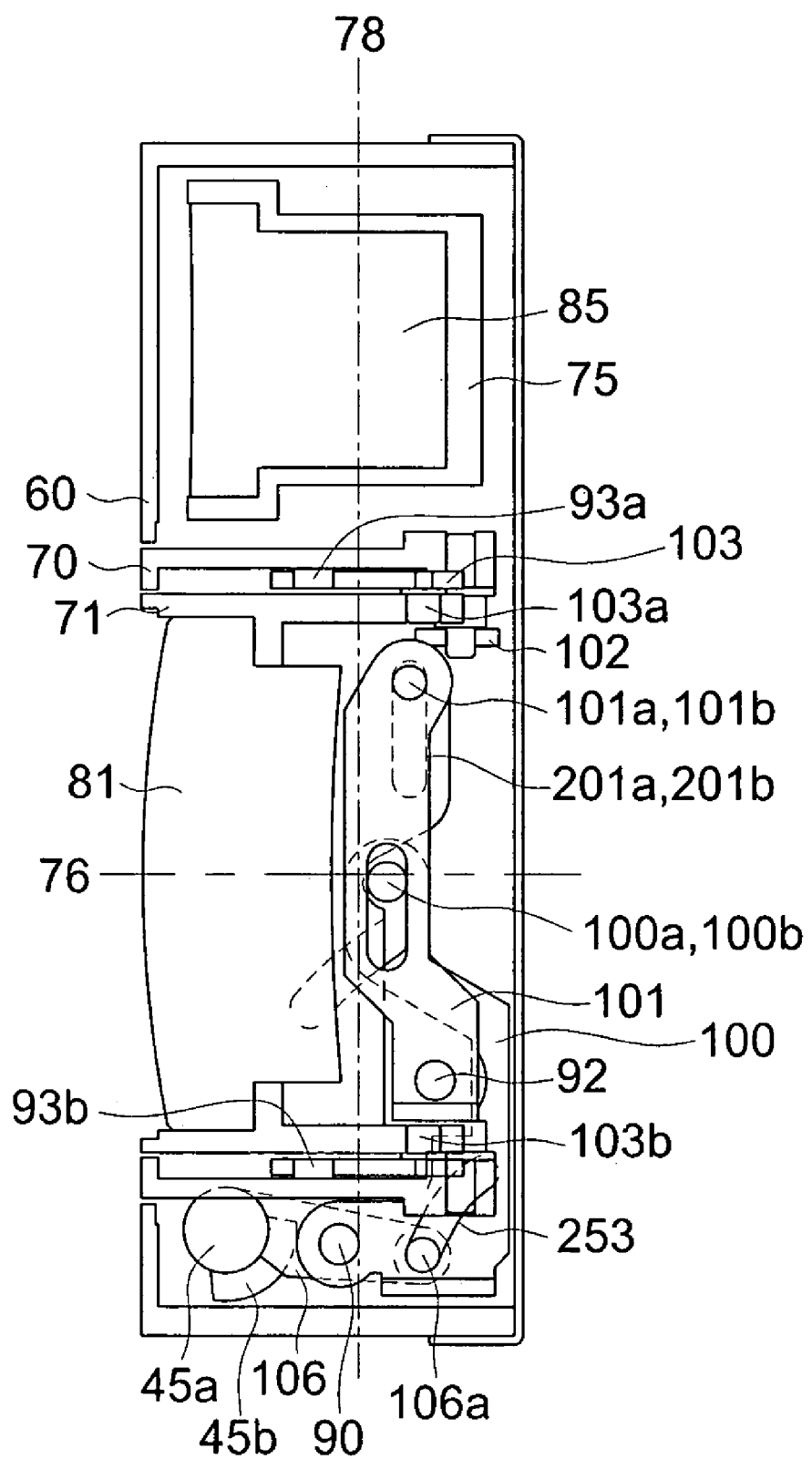
Figure 11:
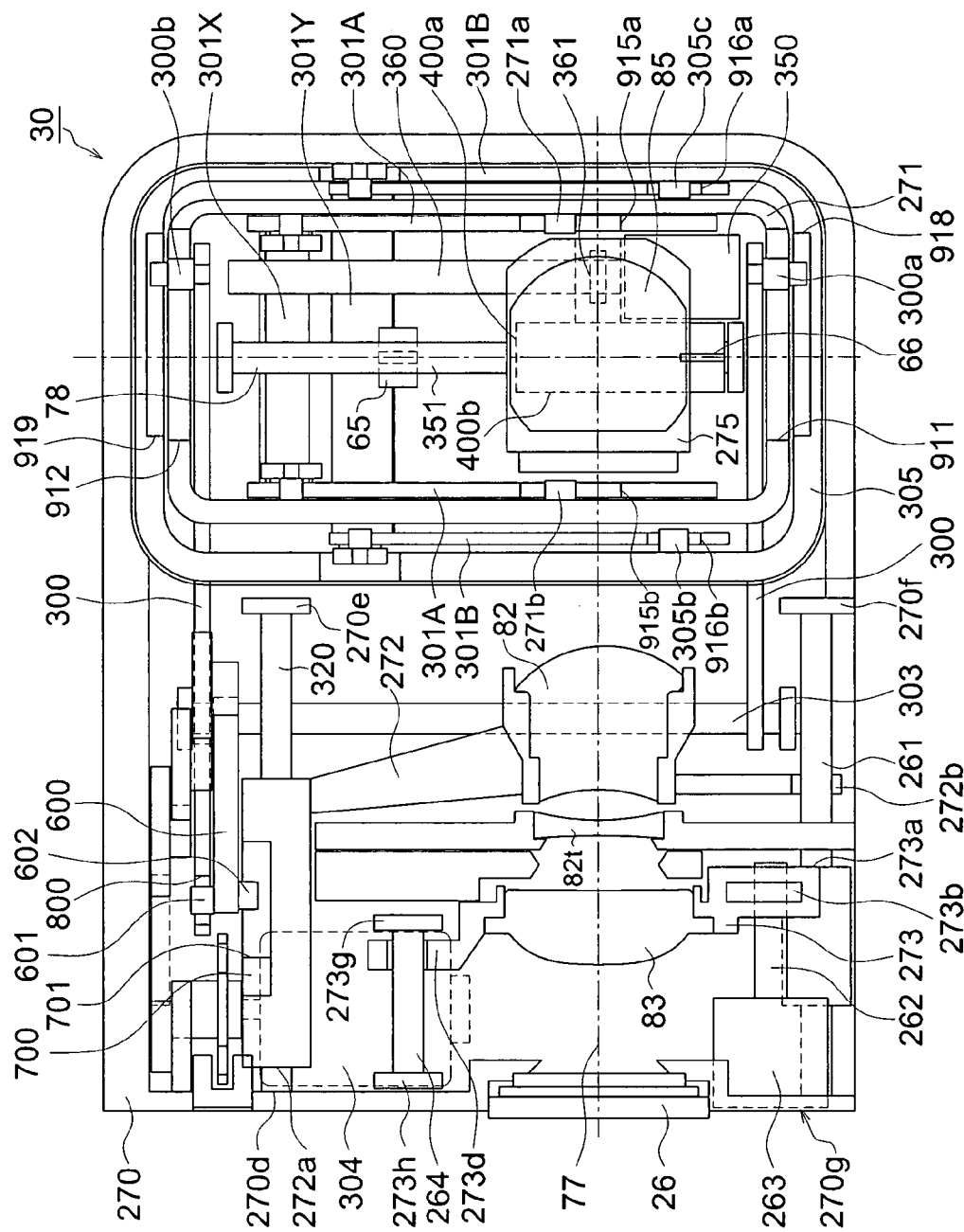
Figure 12:
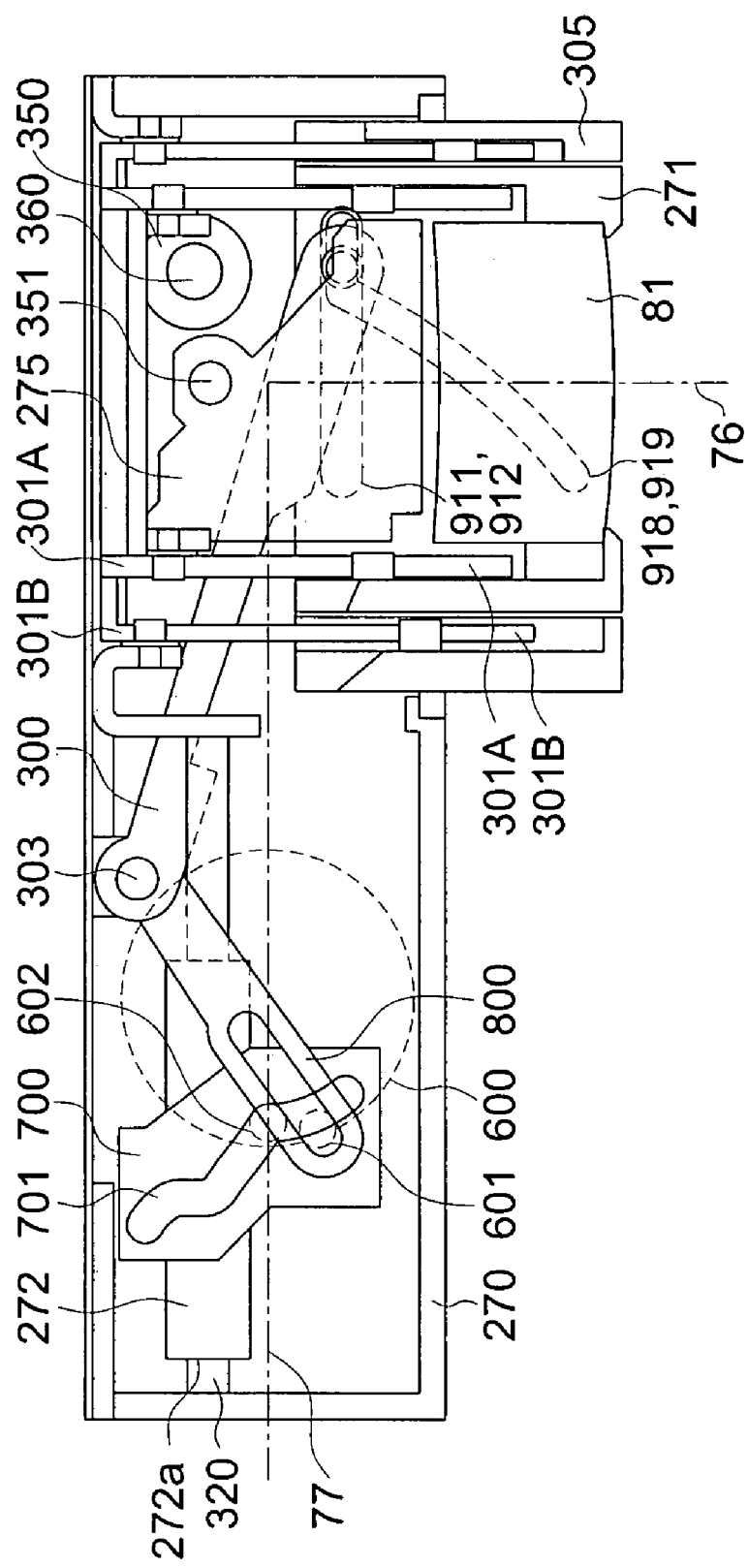
Figure 13:
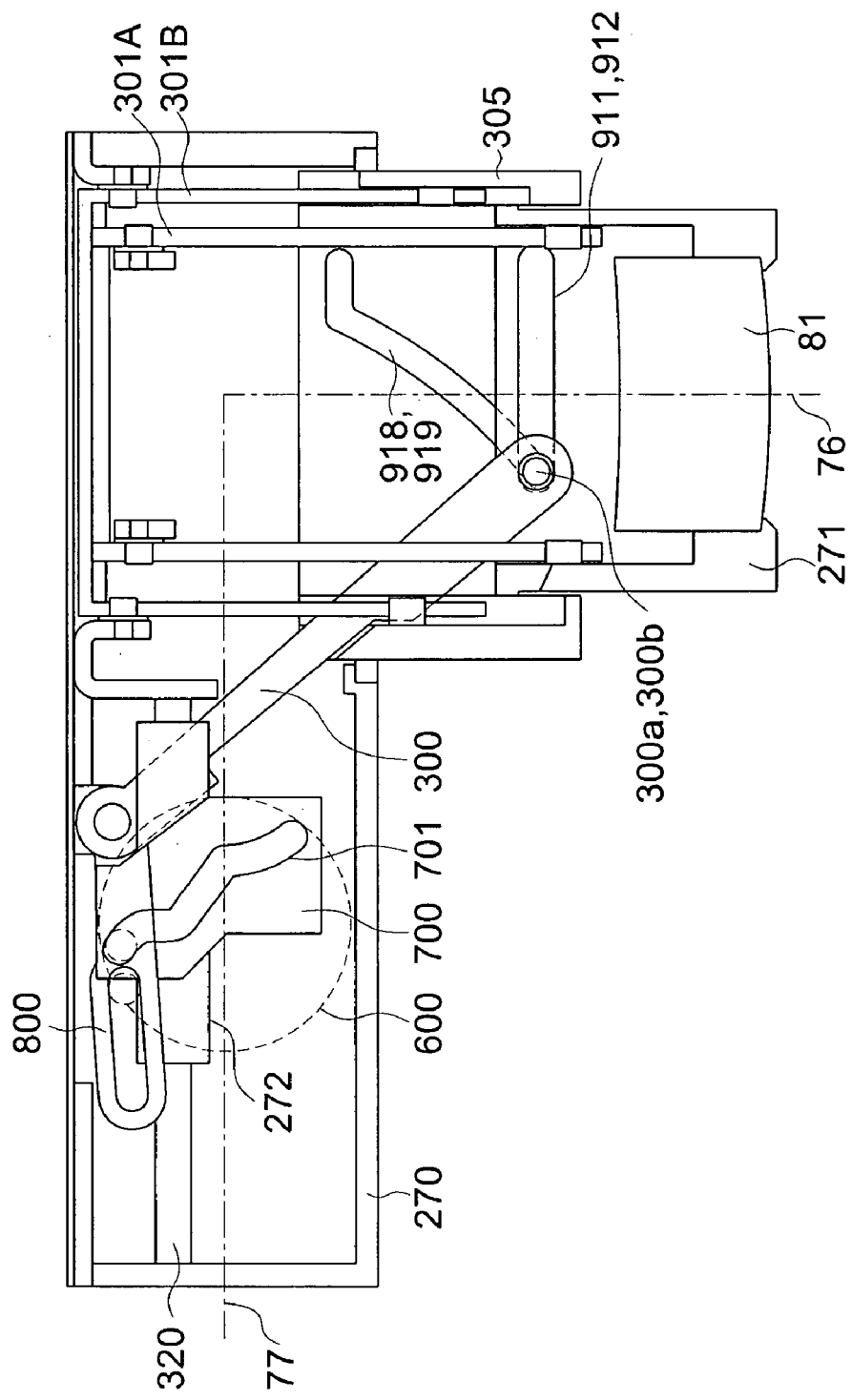
Figure 15:
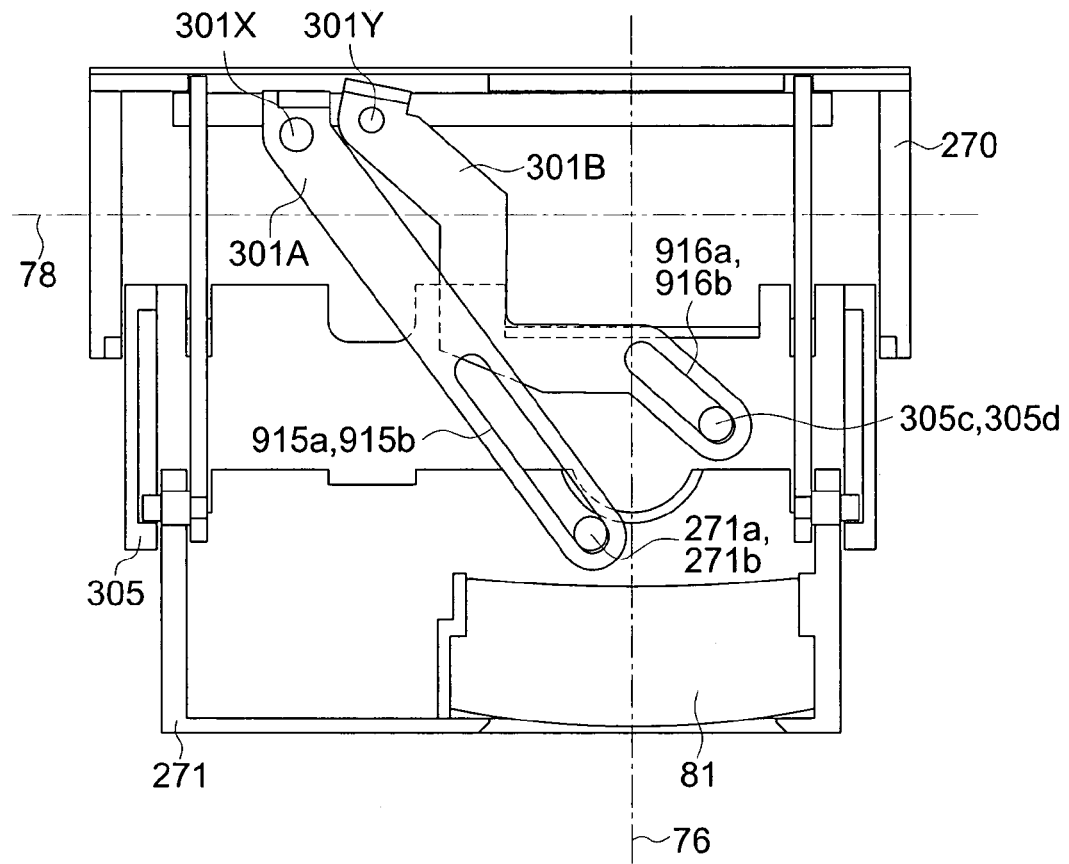
Figure 16:
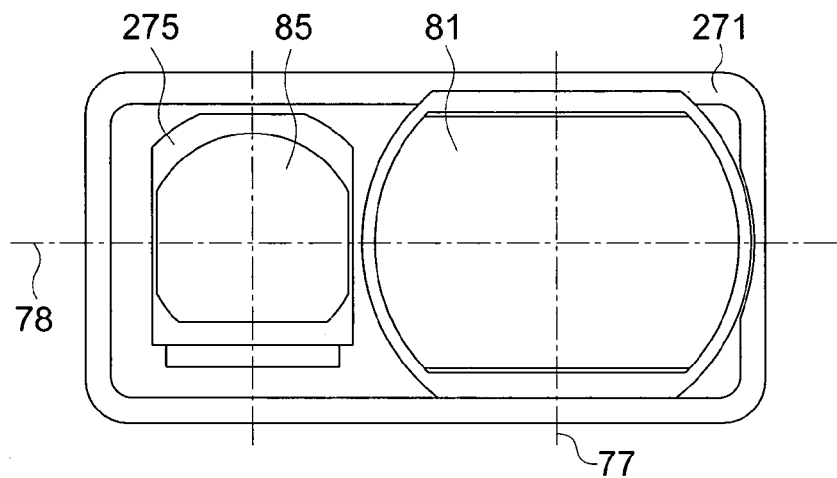
Figure 17:
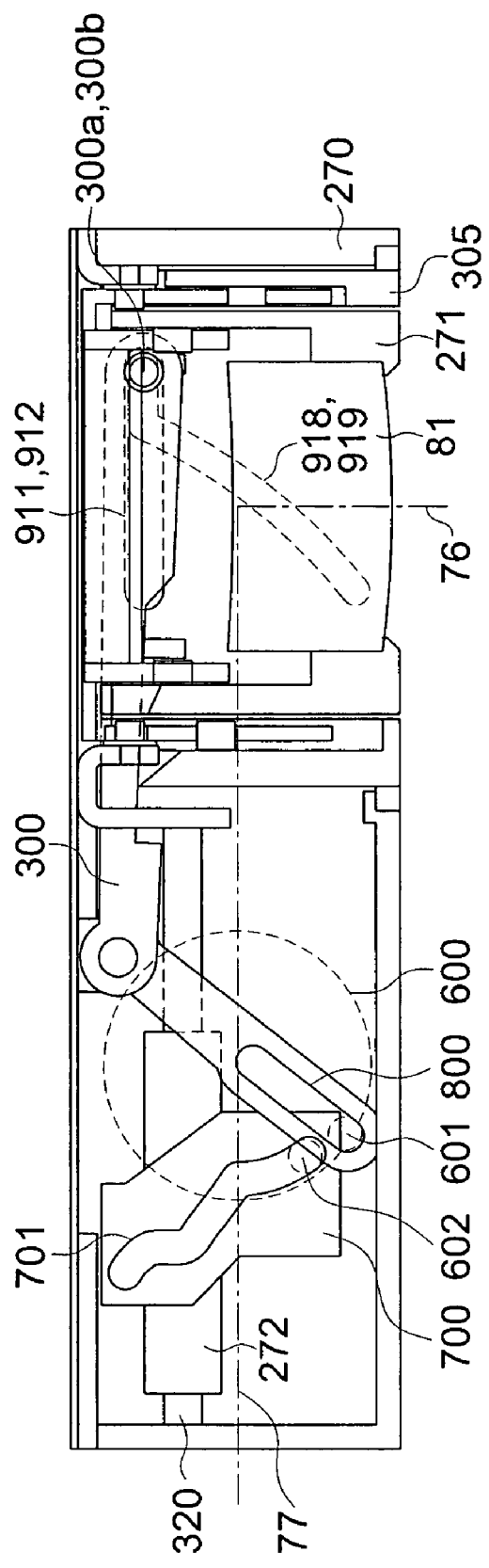
Figure 18:
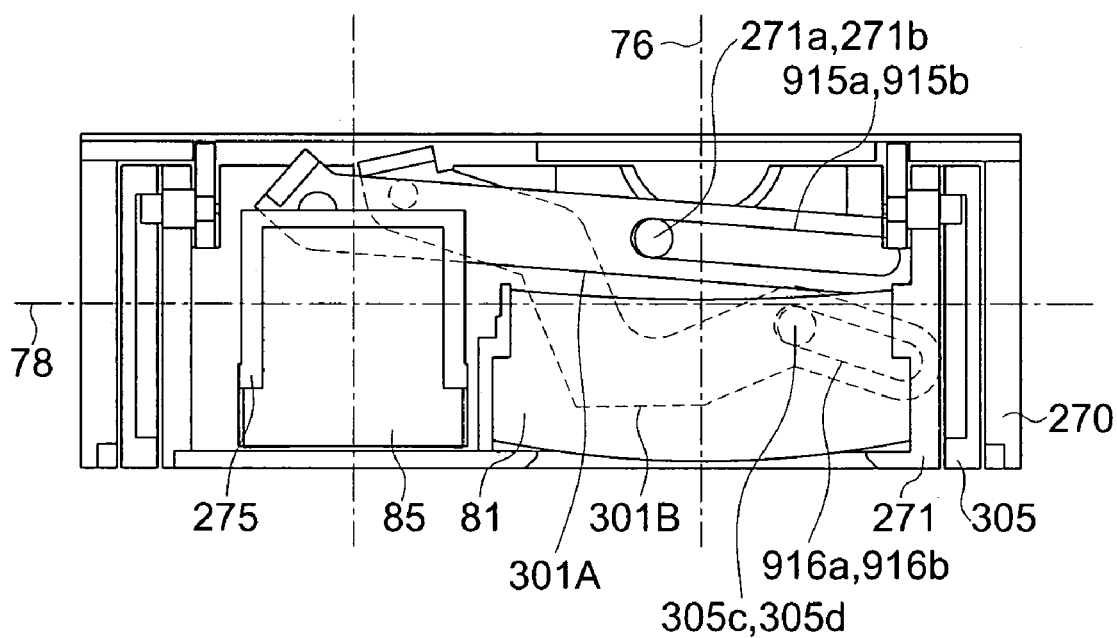
Figure 19:
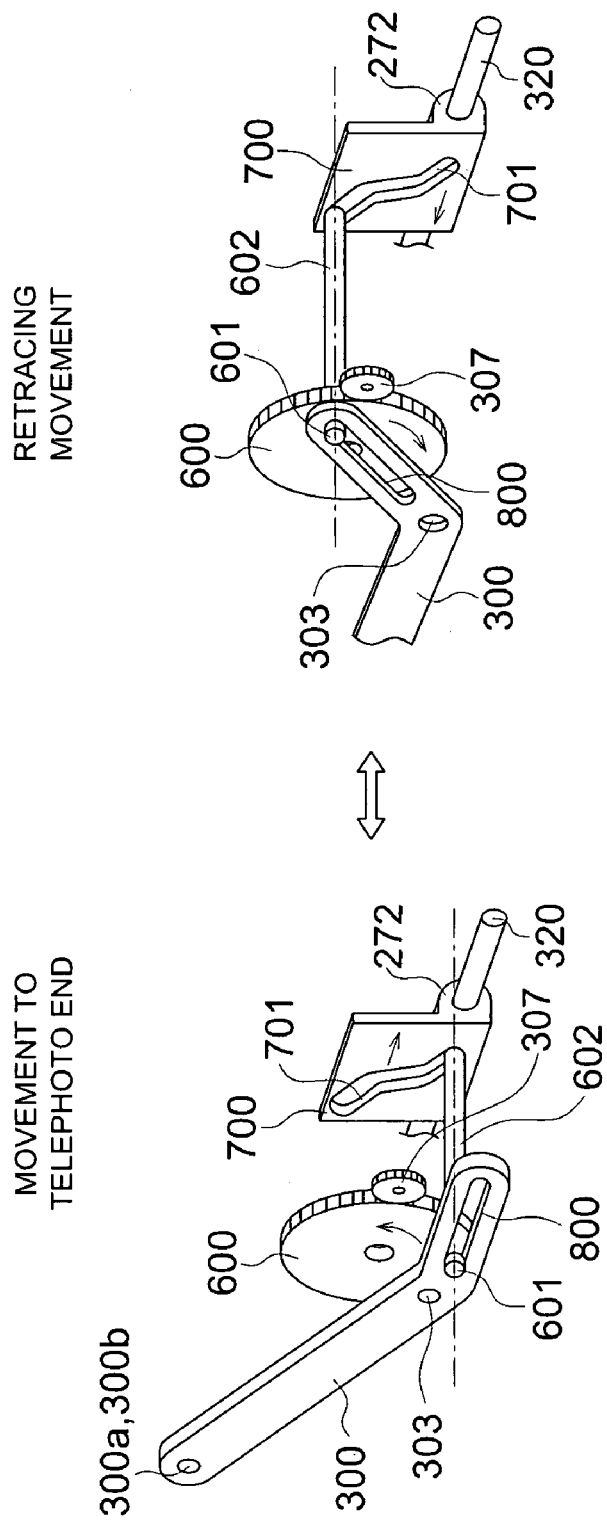
Figure 20:
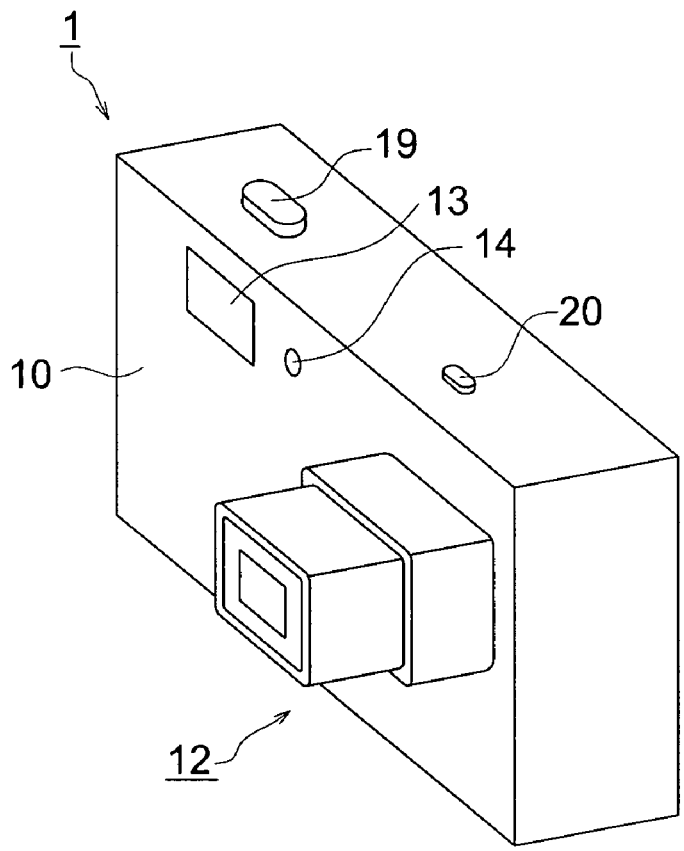
Figure 20:
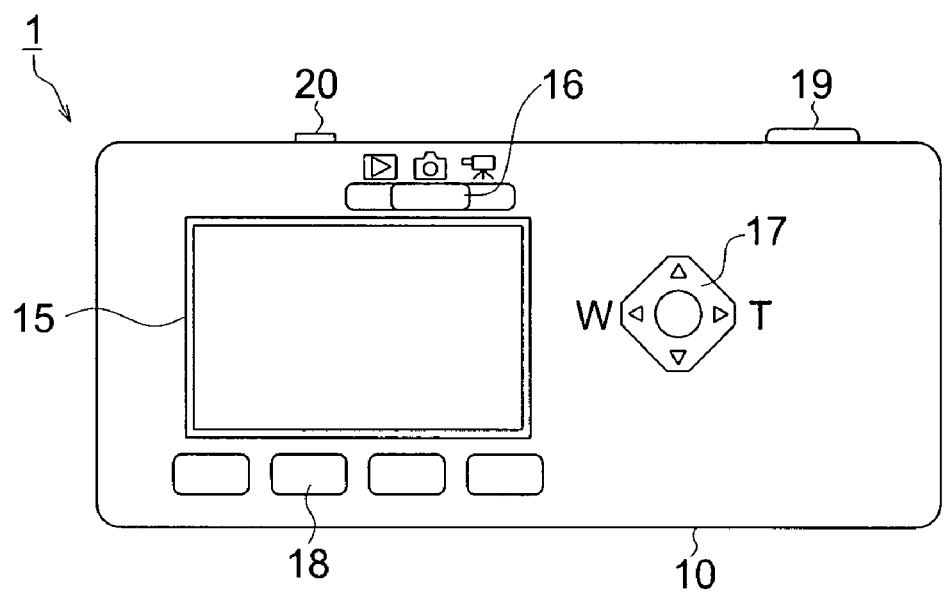
Figure 21:
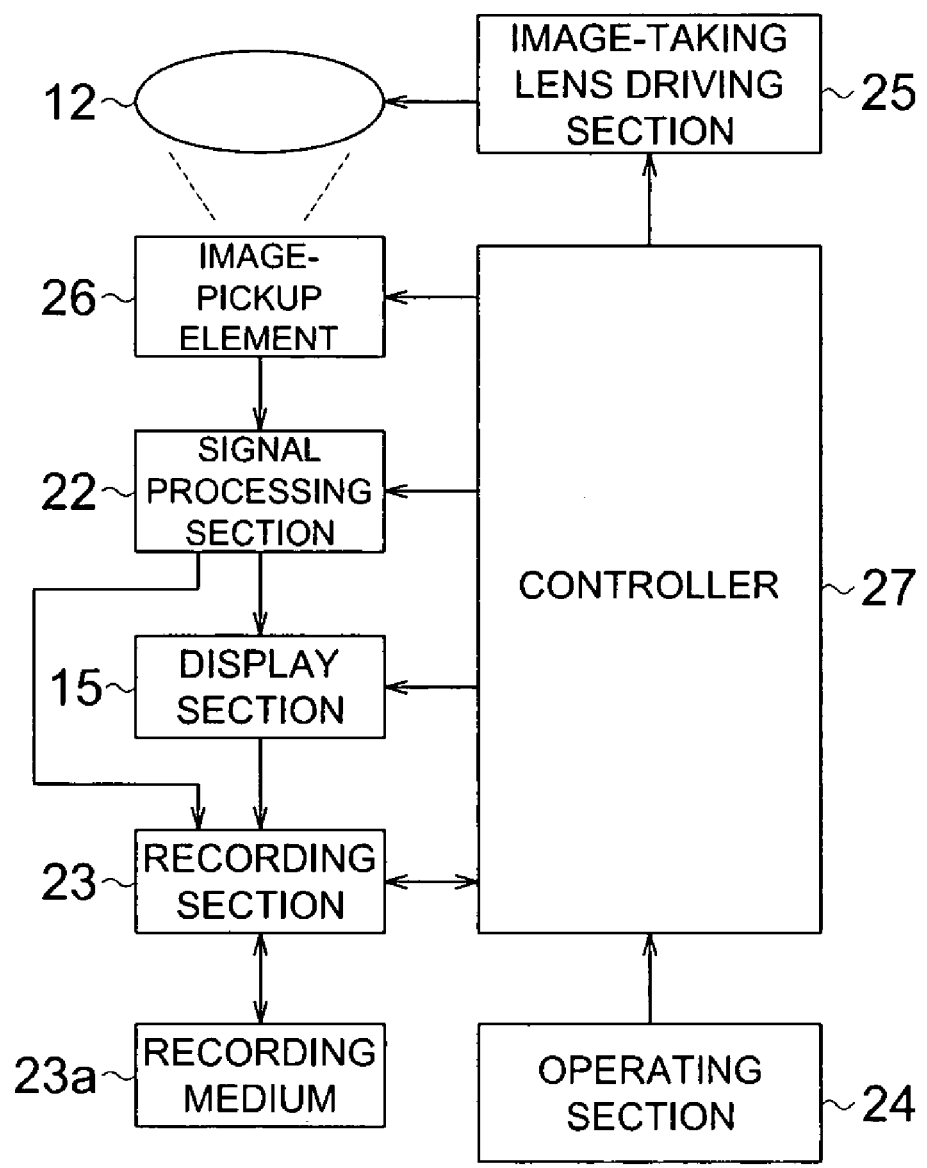

Each of FIGS. 7(a) and 7(b) is a top view of a lens unit of the first embodiment when a prism is mounted or dismounted;

FIG. 8 is a front view of a lens unit of the first embodiment under the retracted condition;

FIG. 9 is a side view of a lens unit of the first embodiment under the retracting condition;

FIG. 10 is a top view of a lens unit of the first embodiment under the retracting condition;

FIG. 11 is a front view of a lens unit of the second embodiment;

FIG. 12 is a side view of a lens unit of the second embodiment at the wide-angle end;

FIG. 13 is a side view of a lens unit of the second embodiment at the telephoto end;

Each of FIGS. 14(a) and 14(b) is a top view of a lens unit of the second embodiment at the wide-angle end;

FIG. 15 is a top view of a lens unit of the second embodiment at the telephoto end;

FIG. 16 is a front view of a lens unit of the second embodiment under the retracting condition;

FIG. 17 is a side view of a lens unit of the second embodiment under the retracting condition;

FIG. 18 is a top view of a lens unit of the second embodiment under the retracting condition;

FIG. 19 is a perspective view showing schematically the circumference of a coupling member of a lens unit of the second embodiment;

FIGS. 20(a) and 20(b) are perspective view and rear view each showing schematically an appearance of a digital camera relating to the present invention; and FIG. 21 is a diagram showing schematically the structure of a digital camera relating to the present invention.

DESCRIPTION OF THE PREFERRED EMBODIMENT

The invention will be explained as follows based on the illustrated embodiment, to which, however the invention is not limited.

An appearance of digital camera 1 representing an image pickup apparatus is shown schematically on each of FIG. 20(a) and FIG. 20(b). FIG. 20(a) is a perspective view and FIG. 20(b) is a rear view.

Digital camera 1 is equipped with camera casing 10 which is almost in a rectangular parallelepiped and with lens unit 12 that protrudes from the camera casing 10 to be used when an image is taken. It is assumed that a depth direction is the direction of protrusion of the lens unit 12, a lateral direction is the horizontal direction of the camera casing, and a longitudinal direction is the vertical direction of each of FIGS. 20(a) and 20(b).

The digital camera 1 includes lens unit 12, flash emission section 13 and self-timer lamp 14 on its front side, display section 15, mode-setting switch 16, cross-shape key 17 and plural operation keys 18 on its rear side, and release button 19 and power supply button 20 on its top surface.

The lens unit 12 is a zoom lens and is arranged in the camera casing 10 along its longitudinal direction in such a condition that when the lens unit 12 is in its service position, a part of the lens unit 12 protrudes from the front side of the camera casing 10, and the lens unit 20 further protrudes when the power changes from a wide-angle end to a telephoto end, while the rest part of the lens unit is bent in terms of an optical axis almost at right angle by a bending member described later. Further, the part of the lens protruding in its service time is housed in a storage position inside the camera casing 10 in the case of out-of-service, for example when the camera is carried without taking image. Housing this protruding part of the lens unit inside the camera casing 10 is called retracting.

The flash emission section 13 emits a flashlight for illuminating an object. The self-timer lamp 14 indicate through its lighting that the preparation for taking an image with self-timer is going on.

The display section 15 on the rear side is composed of a liquid crystal display unit, and it displays various pieces of information such as how a digital camera is set and operation guides in addition to taken images. The mode-setting switch 16 is of a slide type, and it is used for setting of operation mode such as taking an image by digital camera 1 and reproduction. The cross-shape key 17 has four contact points in every direction, and it is used for the movement of a cursor to be displayed on the display section 15. Further, the cross-shape key 17 is used also for adjustment of a focal length of lens unit 12. The operation key 18 is used for establishment relating to functions of digital camera 1 such as switching of items to be displayed on the display section 15 and selection of items displayed. The release button 19 operates on two steps, and it is used for an indication of preparation for taking an image to be recorded under half-pressed state of the release button 19, and is used for an indication of taking an image to be recorded under full-pressed state of the release button 19.

FIG. 21 shows schematically the structure of digital camera 1. The digital camera 1 has therein image pickup element 26, signal processing section 22, recording section 23, operation section 24, image taking lens driving section 25 and controller 27, in addition to lens unit 12 and display section 15. The image pickup element 26 is a CCD area sensor, and it outputs signals based on an amount of received light for each pixel. The signal processing section 22 processes output signals from the image pickup element 26, and generates image data which indicate images thus taken. The recording section 23 records image data generated by the signal processing section 22 on detachable recording medium 23a, and further reads image data from recording medium 23a for reproduction and display of images. The operation section 24 is a general name for mode-setting switch 16, cross-shape key 17, operation keys 18, release button 19 and power supply button 20, and it transmits information concerning buttons operated by users to controller 27.

The image taking lens driving section 25 drives motors such as a motor for zooming, a motor for focusing and a motor for shutter and diaphragm for adjusting exposure, based on the control of controller 27. The image taking lens driving section 25 may be provided also on lens unit 12.

The controller 27 controls operations of each portion of digital camera 1 following the control program. The controller 27 has functions: to carry out preparation operations for taking image of an object such as setting of an exposure control value and focal point adjustment when the release button 19 is half-pressed; and to carry out a series of image taking operations to give exposure to image pickup element 26, to give prescribed image processing to image signals obtained through the exposure and to record them on the recording medium 23a, when the release button 19 is fully pressed.

First Embodiment

Next, an example of lens unit 12 will be explained as follows as the first embodiment.

Figure 1:
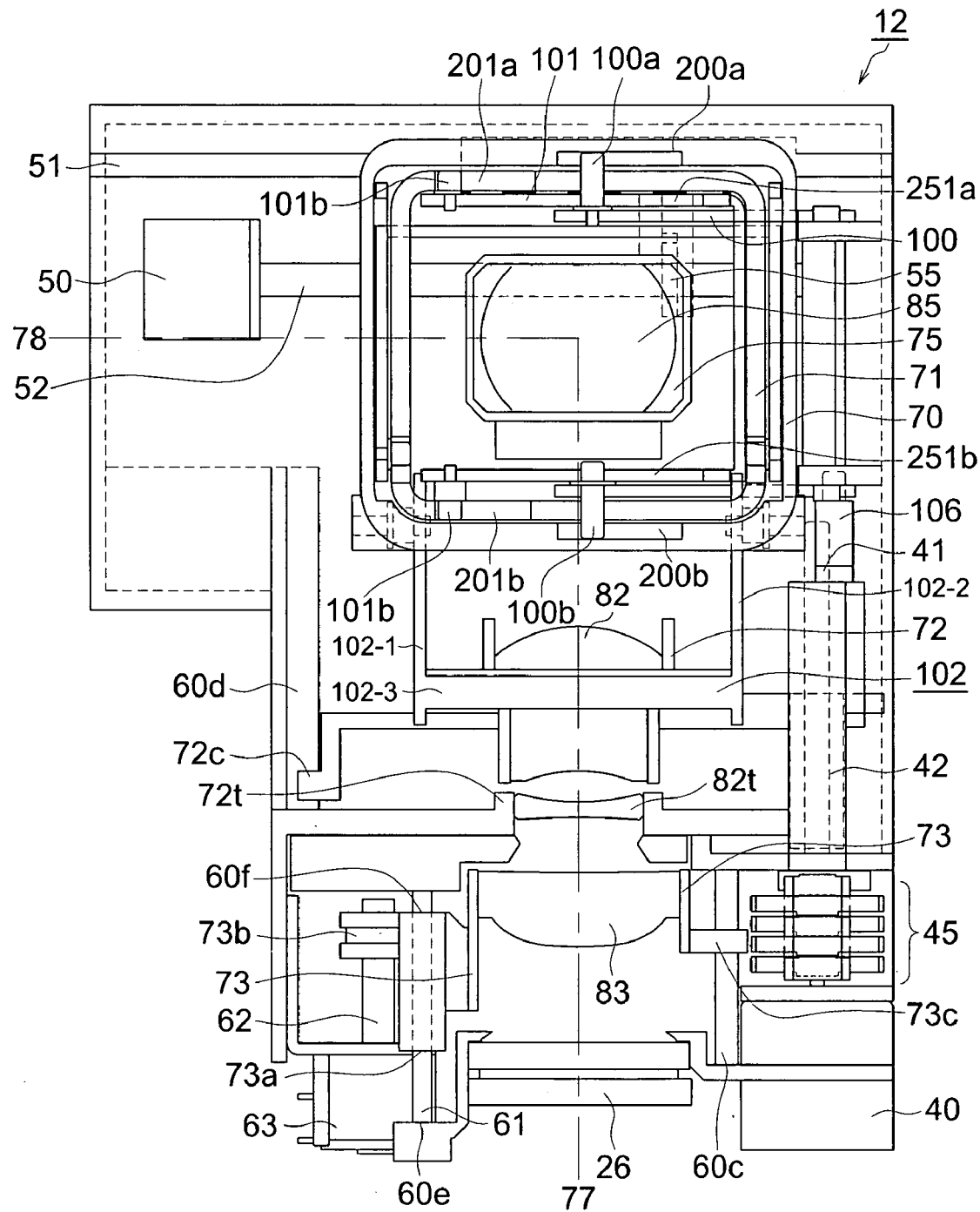
FIG. 1 is a front view of a lens unit of the first embodiment.
Figure 2:
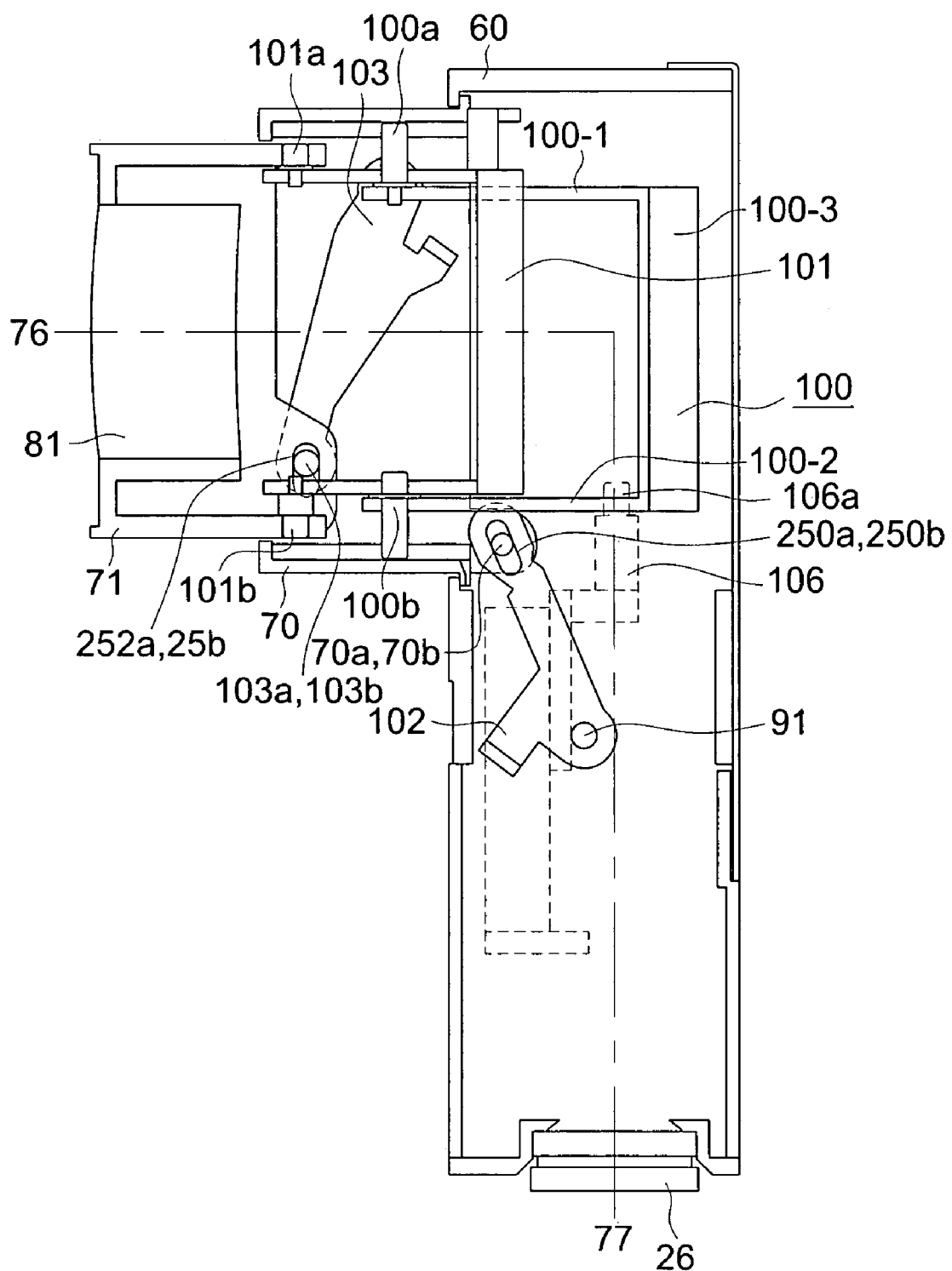
FIG. 2 is a side view of a lens unit of the first embodiment at the telephoto end.
Figure 3:
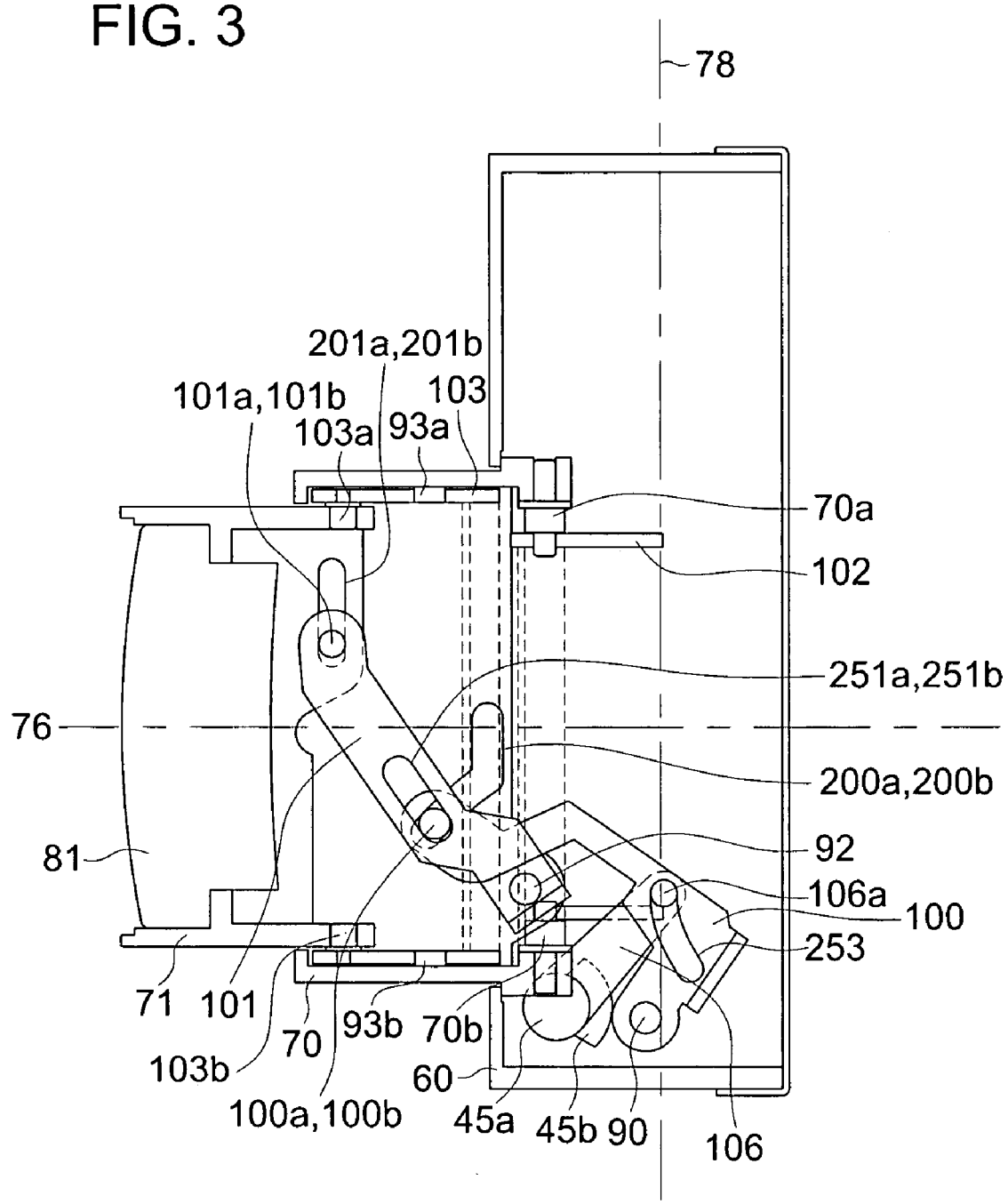
FIG. 3 is a top view of a lens unit of the first embodiment at the telephoto end.
Figure 4:
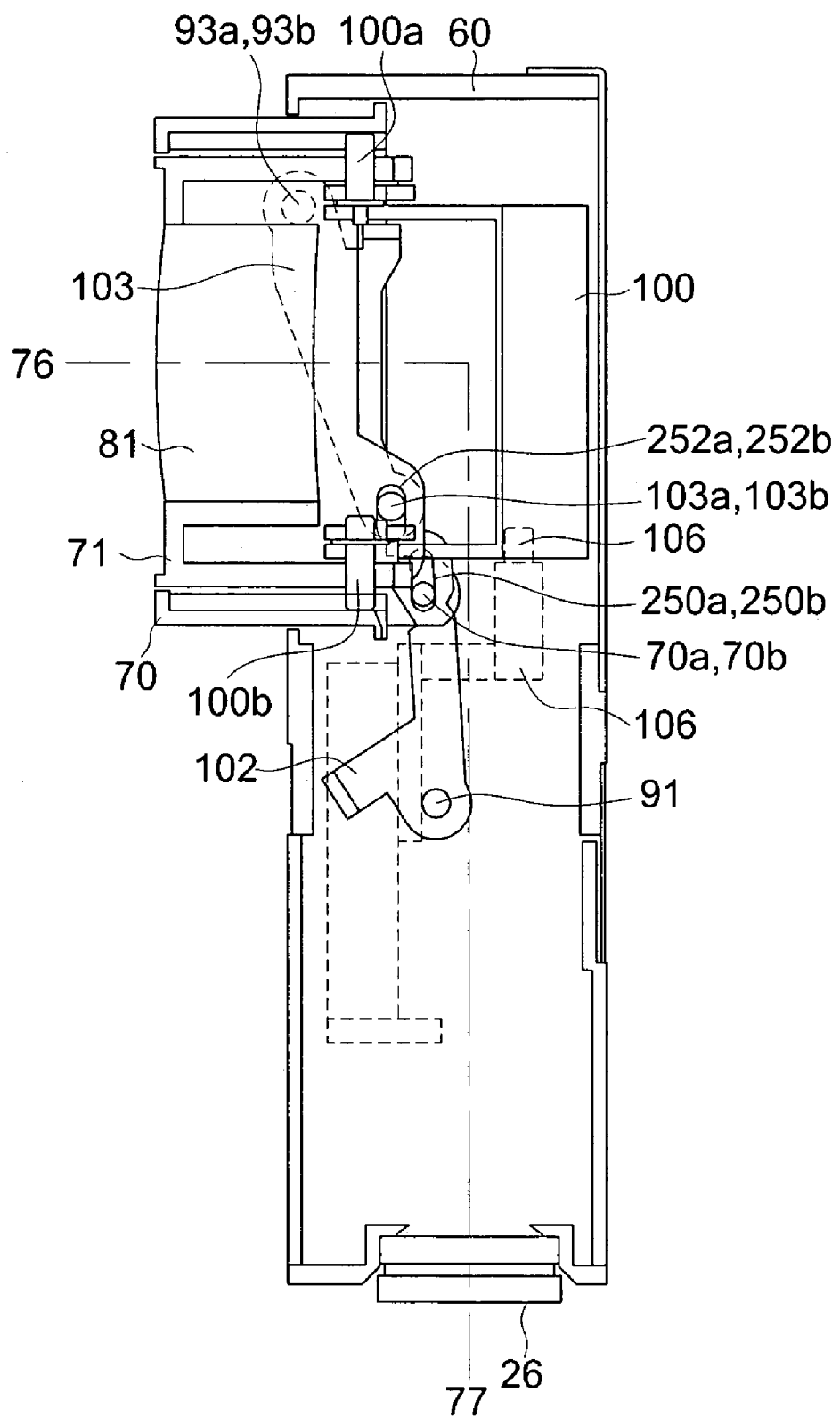
FIG. 4 is a side view of a lens unit of the first embodiment at the wide-angle end.
Figure 5:
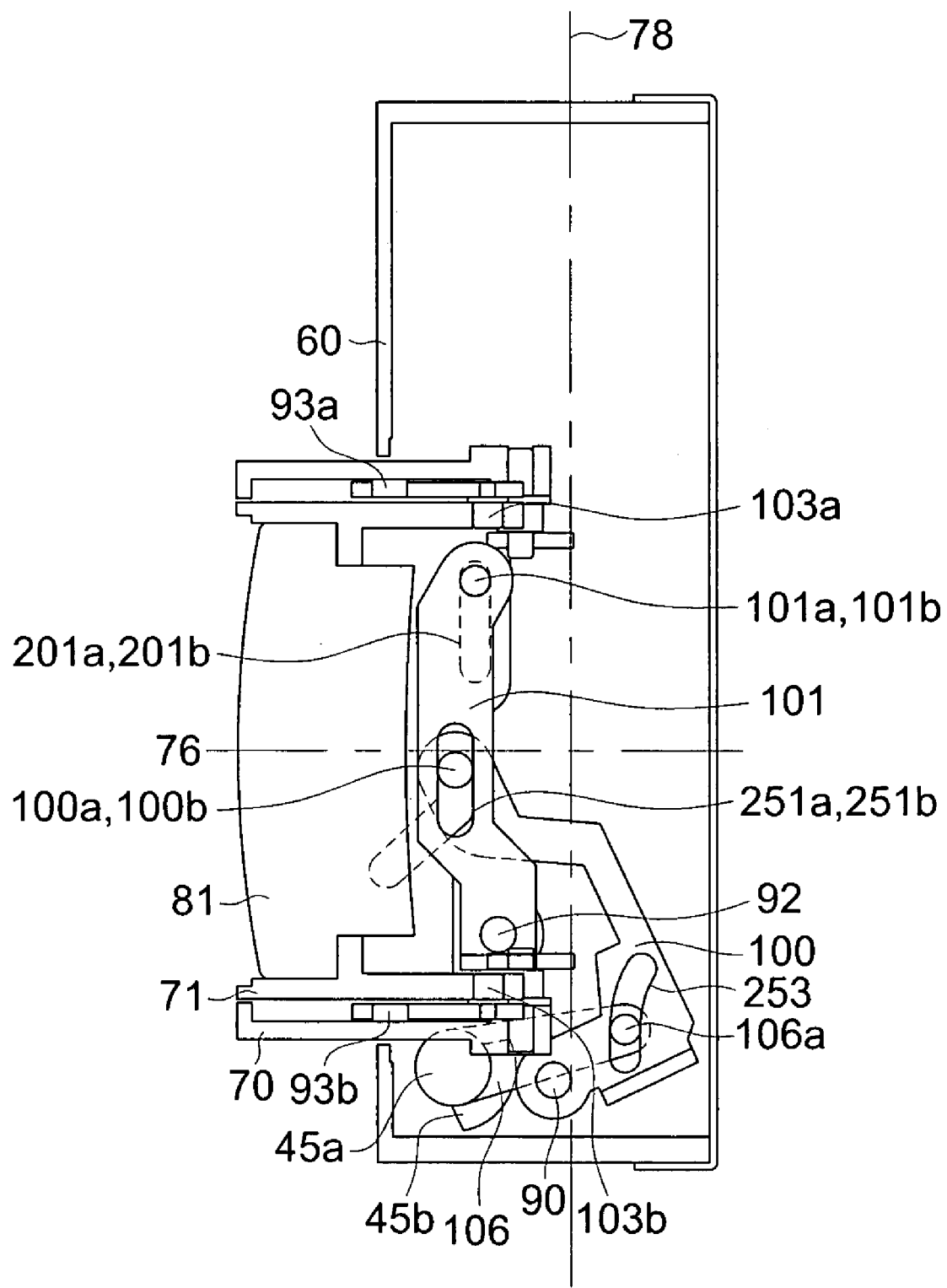
FIG. 5 is a top view of a lens unit of the first embodiment at the wide-angle end.
Figure 6:
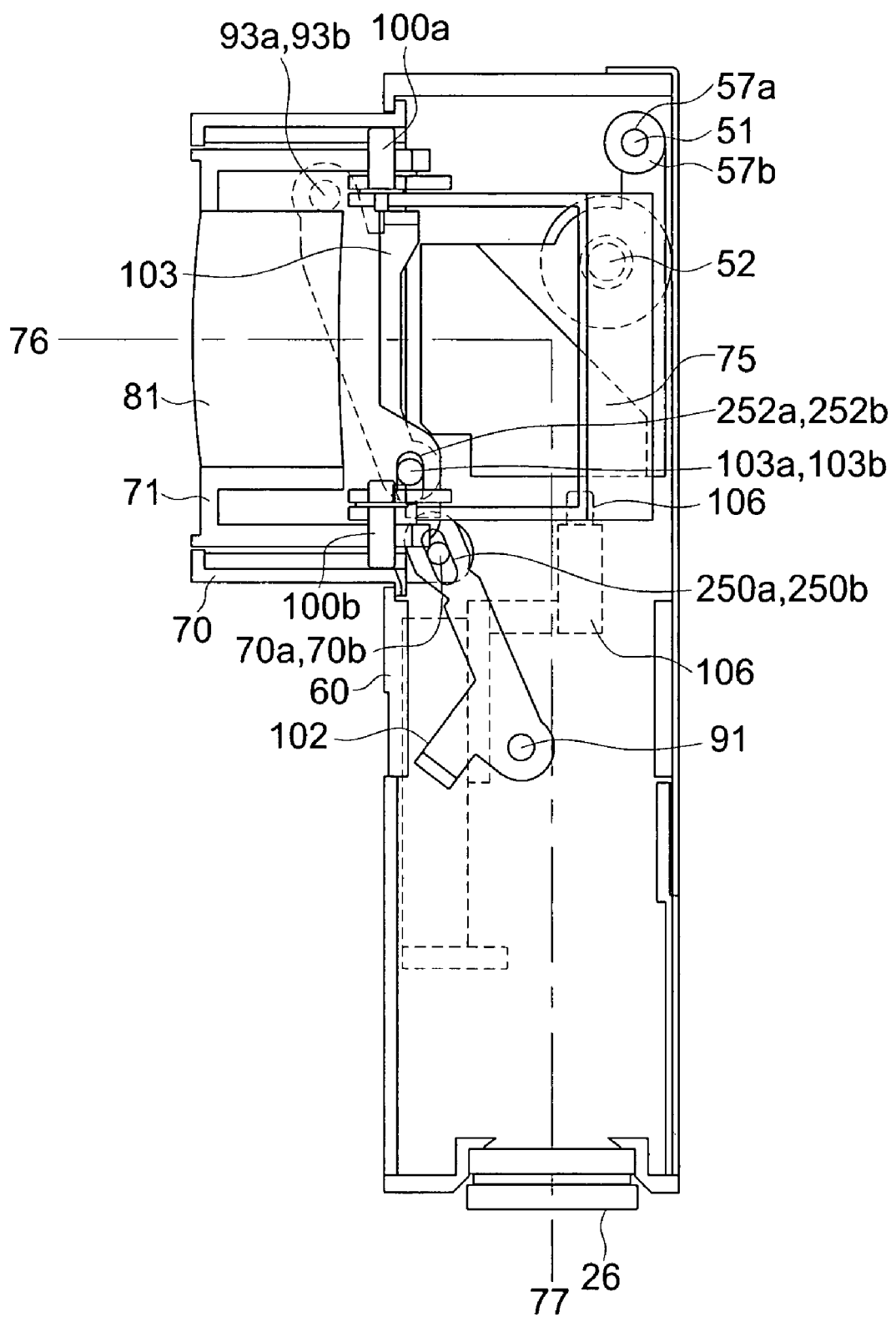
FIG. 6 is a side view of a lens unit of the first embodiment when a prism is mounted or dismounted.

FIG. 1 is a front view of lens unit 12 at the wide-angle end. FIG. 2 is a side view of lens unit 12 at the telephoto end. FIG. 3 is a top view of lens unit 12 at the telephoto end. FIG. 4 is a side view of lens unit 12 at the wide-angle end. FIG. 5 is a top view of lens unit 12 at the wide-angle end. FIG. 6 is a side view of a position (prism inserting and removing position) to which a first rectilinear tube 70 in a rectangular parallelepiped shape and a second rectilinear tube 71 in a rectangular parallelepiped shape are moved under the retracting movement (when the lens unit retracts) or under the raising movement (when the lens unit is raised). FIGS. 7(a) and 7(b) are top views of the position where the prism is inserted or removed. FIG. 8, FIG. 9 and FIG. 10 are respectively a front view, a side view and a top view of the retracting state. FIG. 7(a) shows a mechanism for movement of the first rectilinear tube 70 and the second rectilinear tube 71, while FIG. 7(b) shows mainly a mechanism for prism movement.

With respect to the side views, neither the optical-path bending member, the second lens group nor the third lens group is illustrated, and the side views are used for explanations of movements for first lens group 81, the second rectilinear tube 71 representing a movable frame that holds and moves the first lens group 81, the first rectilinear tube 70 representing a movable frame that holds and moves the second rectilinear tube 71 and a member to drive these rectilinear tubes.

First, the structure of lens unit 12 will be explained, referring to FIGS. 1-5. In the lens unit 12 shown in FIG. 1, a vertical direction is assumed to be the same as the direction of the second optical axis 77, while, a horizontal direction is assumed to be the direction that is perpendicular to both of the directions of the second optical axis 77 and the first optical axis 76. Incidentally, the lens unit 12 can be arranged, with its vertical direction serving as a vertical direction of the digital camera, in camera casing 10. The lens unit 12 is equipped with casing 60 representing a stationary frame, first rectilinear tube 70 and second rectilinear tube 71 each representing a movable frame.

The lens unit 12 includes an image taking lens equipped with first lens group 81 representing a front lens group, prism 85 equipped in an optical-path bending member having a reflection surface for bending an optical path, second lens group 82 including camera-shake-correction lens group 82t representing a rear lens group, and third lens group 83, in this order from the object side. The first lens group 81 is located on the first optical axis 76, and the second lens group 82 and the third lens group 83 are located on the second optical axis 77. This image taking lens forms light coming from the object into an image on image pickup element 26.

The prism 85 is a triangular prism whose section is a rectangular equilateral triangle, and its surface facing the right angle are arranged so as to form an angle of 45° with each of the first optical axis 76 and the second optical axis 77. The surface bends the first optical axis 76 by about 90° toward the direction of the second optical axis 77 as shown in FIG. 6. By bending the optical axis such that the first optical axis 76 and the second optical axis 77 forms an angle of about 90°, it is not necessary to align the first lens group 81, the second lens group 82 and the third lens group 83 in a straight line, which makes it possible to shorten a length of the first lens group 81 in its optical axis direction, or to thin the lens group. Therefore, the lens unit 12 can be thinned.

The second rectilinear tube 71 holds the first lens group 81. The prism holding member 75 holds prism 85 to form a optical-path bending member. The second holding member 72 holds the second lens group 82. The third holding member 73 holds the third lens group 83. In the meanwhile, the alternative of prism 85 that bends an optical path may be a plate-shaped mirror, because it has only to be possible to deflect a light flux coming from an object efficiently and it is not limited to the prism. Camera-shake-correction unit 72t holds camera-shake-correction lens group 82t movably in the direction perpendicular to the second optical axis 77, and corrects displacement of an optical axis caused by camera-shake. A shutter unit (not shown) is fixed on the second holding member 72.

For varying power, the first lens group 81, the second lens group 82 and the third lens group 83 are moved, and for focusing, the third lens group 83 is moved. Incidentally, camera-shake-correction lens group 82t is fixed in the optical axis direction independently of varying power. In the case of varying power from wide-angle end to telephoto end, the first lens group 81 is moved to the object side, the second lens group 82 is moved to the prism 85 side and the third lens group 83 is moved to the image pickup element 26 side.

Second rectilinear tube 71 holding the first lens group 81 and the first rectilinear tube 70 will be explained. In the first rectilinear tube 70, first drive member 100 and first driven member 102 engages with each other. The first drive member 100 is pivotally supported by the casing 60 on shaft 90 and the first driven member 102 is pivotally supported by the casing 60 on shaft 91. Each of the shaft 90 and the shaft 91 is perpendicular to the optical axis 76 and the shaft 90 and the shaft 91 is also perpendicular to each other. The first drive member 100 has a U-shaped structure formed by two arm sections 100-1 and 100-2 which are arranged at both sides of the optical axis 76, and a connecting section 100-3 as shown in FIG. 2. Similarly, the first driven member 102 has a U-shaped structure formed by two arm sections 102-1 and 102-2, and a connecting section 102-3, as shown in FIG. 1. The first drive section 100 and the first driven section 101 are positioned perpendicular to the optical axis 76 and to each other. There are arranged the shaft 90 at one end of the two arm sections 100-1 and 100-2 of the first drive member 100, and pins 100a and 100b at the other end of the two arm sections 100-1 and 100-2, as shown in FIG. 3. The pins 100a and 100b are parallel to the shaft 90. These pins 100a and 100b are respectively engaged with guide grooves 200a and 200b arranged on the top and bottom of the first rectilinear tube 70. There are arranged a shaft 91 at one end of the two arm sections 102-1 and 102-2 of the first driven member 102, and elongated holes 250a and 250b at the other end of the two arm sections 102-1 and 102-2, as shown in FIG. 2. These elongated holes 250a and 250b respectively engages in the horizontal direction of the first rectilinear tube 70 with pins 70a and 70b which are parallel to the shaft 91. As shown in FIG. 1, when first motor 40 rotates, drive shaft member 106 is rotated by rotation drive force decelerated by a reduction gear train. As shown in FIG. 3, driving force is transmitted to first drive member 100 equipped with elongated hole 253 that engages with pin 106a provided on drive shaft member 106, thus, the first drive member 100 rotates on shaft 90.

When the first drive member 100 rotates, the first rectilinear tube 70 equipped with guide grooves 200a and 200b which engage respectively with pin 100a and 100b moves forward and backward in the direction of the first optical axis 76. When the first rectilinear tube 70 moves forward and backward along the optical axis, pin 70a and pin 70b also move, and thereby, the first driven member 102 is rotated on the shaft 91.

By providing the first drive member 100 and the first driven member 102 which have U-shaped structure and are perpendicular to each other and which engage with the first rectilinear tube 70 and support the first rectilinear tube 70, they restrict the shift of the first rectilinear tube 70 in the up and down, and left and right direction, and restrict the rotation of the first rectilinear tube 70 in the perpendicular direction to the optical axis 76. Thereby, it allows the first rectilinear tube 70 moves along the optical axis 76 precisely.

The second rectilinear tube 71 is supported by the first rectilinear tube 70 such that the second rectilinear tube 71 can move in and out from the first rectilinear tube 70, and second drive member 101 and second driven member 103 engage with each other. The second drive member 101 is pivotally supported by the shaft 92 and the second driven member 103 is pivotally supported by the shafts 93a and 93b. The shafts 92, 93a, and 93b are perpendicular to the optical axis 76 and the shaft 92 is perpendicular to the shafts 93a and 93b.

The second drive member 101 has a U-shaped structure formed by two arm sections 101-1 and 101-2 which are arranged at both sides of the optical axis 76, and a connecting section 101-3 as shown in FIG. 2. Similarly, the second driven member 103 has a U-shaped structure formed by two arm sections 103-1 and 103-2, and a connecting section 103-3, as shown in FIG. 2. The second drive member 101 and the second driven member 103 are positioned perpendicular to the optical axis 76 and to each other.

There are arranged the shaft 92 at one end of the two arm sections 103-1 and 103-2 of the second drive member 101, and pins 101a and 101b at the other end of two arm sections 103-1 and 103-2, as shown in FIGS. 2 and 3. The pins 101a and 101b are parallel to a first axis (the shaft 92). These pins 101a and 101b respectively engage with guide grooves 201a and 201b arranged on the top and bottom of the second rectilinear tube 71. The second driven member 101 has elongated holes 251a and 251b between the shaft 92 and the pins 101a and 101b, and the pins 100a and 100b of the first drive member 100 respectively engage with the elongated holes 251a and 251b. The second drive member 101 is rotated by the first drive member 100 on the shaft 92 and forms a drive arm which drives the second rectilinear tube 71. The shaft 92 is supported by the first rectilinear tube 70.

There are arranged the shafts 93a and 93b at one end of the two arm sections 103-1 and 103-2 of the second driven member 103, and pins 103a and 103b at the other end of the two arm sections 103-1 and 103-2, as shown in FIG. 2. The pins 103a and 103b are parallel to a second axis (the shafts 93a and 93b). These pins 103a and 103b respectively engage with elongated holes 251a and 251b arranged on the right and left of the second rectilinear tube 71. When the first drive member 100 rotates, the second drive member 101 provided with the elongated holes 251a and 251b which engage with the pins 100a and 100b is driven, and the second rectilinear tube 71 provided with the guide grooves 201a and 202b which engage with the pins 101a and 101b moves forward and backward along the optical axis 76. When the second rectilinear tube 71 moves forward and backward along the optical axis, the pins 103a and 103b also moves. Following the movement, the second driven member 103 is rotated on the pins 93a and 93b as the rotation axis. The pins 93a and 93b are pivotally supported by the first rectilinear tube 70.

For example, in FIG. 5, the first lens group 81 held by the second rectilinear tube 71 is positioned at the wide-angle end. Under the condition, when the drive shaft member 106 rotates in counter-clockwise direction facing the sheet of FIG. 5, driving force is transmitted to the first drive member 100 and the second drive member 101. The first drive member 100 and the second drive member 101 which receive the driving force engage with the first rectilinear tube 70 and the second rectilinear tube 71, thus, the first rectilinear tube 70 and the second rectilinear tube 71 are sent out to the object side. Therefore, the first lens group 81 reaches the telephoto end, as shown in FIG. 3. When the drive shaft member 106 rotates in clockwise direction from this state, the first lens group 81 reaches the wide-angle end from the telephoto end. There is the position for inserting and removing a prism which will be described later between the telephoto end and the wide-angle end.

As described above, the driving force can be transmitted in long distance by a simple structure such that the first rectilinear tube includes the first drive member 100 pivotally supported by the casing and the first driven member 102, and that the second rectilinear tube includes the second drive member 101 and the second driven member 103, and by engaging the first drive member with the second drive member. Thereby, the first lens group 81 moves in larger moving distance with accuracy.

Furthermore, by providing the U-shaped second drive member 101 and second driven member 103 both pivotally supported by the first rectilinear tube 70 and being perpendicular to each other, which engages with the second rectilinear tube 71 to support the second rectilinear tube 71, it regulate the shift of the second rectilinear tube 71 in top and bottom, left and right directions, and regulates the rotation of the second rectilinear tube 71 in the perpendicular direction to the optical axis 76. Thereby, the second rectilinear tube 71 moves along the optical axis 76 precisely.

By providing the arms of the second driven member 103 arranged in U-shape at the left and right of the second rectilinear tube 71 which have a structure so as to move slidably on the inner surface of the first rectilinear tube 70 and on the outer surface of the second rectilinear tube 71, it regulate the shift of the second rectilinear tube 71 in top and bottom, left and right directions, and restricts the rotation of the second rectilinear tube 71 in the perpendicular direction to the optical axis 76. Thereby, the second rectilinear tube 71 moves along the optical axis 76 more precisely. As described above, since the first rectilinear tube 70 precisely moves along the optical axis 76, the second rectilinear tube 71 which moves along the first rectilinear tube 70 also moves precisely.

Further, the second drive member 101 is pivotally supported by the first rectilinear tube 70 on the shaft 92, and the pins 101a and 101b engage with the second rectilinear tube 71. The relationship between the pivotal support and engagement may become reversed. Similarly, the second driven member 103 is pivotally supported by the first rectilinear tube 70 on the shafts 93a and 93b, and the pins 103a and 103b engage with the second rectilinear tube 71. The relationship between the pivotal support and engagement may become reversed.

Next, retracting movement will be explained. As shown in FIGS. 9 and 10, when an image is not taken, the second rectilinear tube 71 that holds the first lens group representing a movable frame and the first rectilinear tube 70 holding the second rectilinear tube 71 representing also a movable frame are telescopically housed in casing 60 representing a stationary frame. This is called retracting. In the case of the retracting, the second rectilinear tube 71 and the first rectilinear tube 70 are moved to the prism inserting and removing position, as shown in FIGS. 6, 7(a) and 7(b).

After the aforesaid movement, prism holding member 75 holding prism 85 as shown in FIGS. 8-10 retreats in the direction of axis 78 (virtual axis) that is substantially perpendicular to the first plane formed by the first optical axis 76 and the second optical axis 77. An angle of the axis in the direction that is substantially perpendicular to the first plane is in a range of not more than 15°, under the condition that an angle of the axis perpendicular to the first plane is 0°. If the direction for the prism holding member 75 holding prism 85 to retreat is made to be substantially perpendicular to the first plane, a distance for movement does not turn out to be too long, whereby it is possible to avoid interference with other mechanisms while attaining downsizing. Then, the second rectilinear tube 71 and the first rectilinear tube 70 travel along the first optical axis 76 to the space (retracting space) that is formed by the retreated prism holding member 75, and retract and are housed in the space. The position to which the prism holding member 75 holding the prism 85 has retreated in this case is assumed to be a retreating position. In the case of retracting, the second rectilinear tube 71, the first rectilinear tube 70 and the second holding member 72 move together, as shown in FIG. 6, FIG. 9, FIG. 7(a), 7(b) and FIG. 10.

The first rectilinear tube 70 and the second rectilinear tube 71 equipped with the first lens group 81 are required to be set at positions where they do not interfere with the prism holding member 75 when it retreats in the direction of axis 78 (virtual axis) that is perpendicular to the first plane formed by the first optical axis 76 and the second optical axis 77. This position is assumed to be a prism inserting and removing position. Incidentally, this position may be determined properly by considering convenience for use of digital camera 1 equipped with lens unit 12.

When the first motor 40 is driven, drive shaft member 106 is rotated, then, driving force is transmitted to the first drive member 100 and the second drive member 101, and the first rectilinear tube 70 and the second rectilinear tube 71 move to the prism inserting and removing position located between a wide-angle end (wide end) and a telephoto end (tele-end), as shown in FIGS. 6, 7(a) and 7(b).

Next, prism holding member 75 holding prism 85 is retreated to the retreating position. The prism holding member 75 holding prism 85 has second slide guiding portion 57b and second slide guiding hole 57a each representing a movement mechanism, and the second slide guiding hole 57a engages with second guide shaft 51 fixed on casing 60. On the prism holding member 75, there is provided a key (not shown) serving as a rotation-stopper, and this key engages with a key groove (not shown) that is in parallel with guide shaft 51 and is provided on the stationary frame. Further, the second slide guiding portion 57b is moved by second drive shaft 52 provided with a male screw that is driven by the second motor 50 and by engagement screw 55 provided with a female screw that engages with the male screw.

A rotation of the second motor 50 rotates the second drive shaft 52, and its rotation moves the engagement screw 55. Prism holding member 75 provided with the second slide guiding portion 57b connected with the engagement screw 55 is moved linearly along the second guide shaft 51 to retreat to the retreating position shown in FIG. 8 and FIG. 10. In this case, the key of the prism holding member 75 slides on a key groove provided on a stationary frame. By causing the prism holding member 75 to move linearly for retreating as stated above, it is possible to make a space needed for retreating to be small. Therefore, casing 60 representing a stationary frame in which lens unit 12 is housed can be made small.

As a moving mechanism for moving prism 85 linearly in the present embodiment, the second drive shaft 360 and the engagement screw 55 are used. However, it is possible to use, without being limited to the foregoing, the linear actuator such a, for example, a linear motor and SIDM (Smooth Impact Drive Mechanism: Drive unit employing electromechanical conversion element such as a piezoelectric element) and a link mechanism such as a rack/pinion and a pantograph mechanism.

It is preferable that the aforesaid moving mechanism for moving the prism 85 is provided in the space formed by a surface including a reflecting surface of prism 85, an upper surface of stationary frame 60, and an end surface of the stationary frame 60 positioned to be opposite to the object. By providing the moving mechanism in this space, lens unit 12 can be made small because a space inside the casing 60 can be utilized effectively. Further, the second rectilinear tube 71 and the first rectilinear tube 70 can retract sufficiently into a space (retraction space) formed by retreated prism 85. Therefore, it is more preferable that moving mechanism members such as the second drive shaft 52 and the second guide shaft 51 only are arranged in this space, and an actuator such as a voluminous motor, for example, is provided at the position to which the prism 85 has retreated, though it depends on the size.

Now, the position of the prism 85 that bends an optical path to make the first optical axis 76 in the direction of the second optical axis 77 before the prism 85 retreats is assumed to be called an optical path bending position from now on including the second embodiment.

Then, the first motor 40 is driven, and the first rectilinear tube 70 is moved to the retracting position shown in FIG. 9 and FIG. 10 by a rotation of the first drive member 100. In this case, the second drive member 101 is driven by the first drive member 100 which has been driven, and the first rectilinear tube 70 and the second rectilinear tube 71 are brought into the casing 60, while keeping the positional relationship identical to that at the prism inserting and removing position, thus, retracting actions are completed. The reason why the positional relationship identical to that at the prism inserting and removing position is kept is because of the second drive member 101 that does not rotate because guide grooves 200a and 200b (see FIG. 3) of the first rectilinear tube 70 engaging respectively with pin 100a and pin 100b of the first drive member 100 are the same as elongated holes 251a and 251b of the second drive member 101 in terms of a shape.

For raising the lens unit, operations are opposite to those for retracting actions. Namely, the first motor 40 is driven in the opposite way to the above description, and the first rectilinear tube 70 and the second rectilinear tube 71 are moved to the prism inserting and removing position while keeping the positional relationship identical to that at the retracting position, as shown in FIG. 6 and FIGS. 7(a) and 7(b). Then, as shown in FIG. 8, the second drive shaft 52 is rotated by a rotation of the second motor 50, and the rotation of the second drive shaft 52 moves engagement screw 55, whereby, prism holding member 75 is moved linearly along the second guide shaft 51 to be set to the optical path bending position from the retreating position. Owing to this, the lens unit 12 is made to be ready for taking an image.

For moving the prism holding member 75 to the retreating position and to the optical path bending position for positioning, a photo-interrupter (not shown) is provided on casing 60 as a position sensor for each of the retreating position and the optical path bending position. Further, on the prism holding member 75, there is provided a light shielding plate (not shown) that is provided on a photo-interrupter to shield an optical path for detection.

When this light shielding plate intercepts an optical path of the photo-interrupter provided on the retreating position, for example, controller 27 detects the interception of the optical path to stop the second motor 50, thus, the prism holding member 75 is stopped at the retreating position accurately. This also applies equally to the optical path bending position. The position for providing the light shielding plate is not limited to the prism holding member 75, and it may also be the second slide guiding portion 57b if it is one that moves linearly in the same way as in the prism 85 when it moves.

The prism holding member 75 that holds prism 85 as stated above retreats linearly in the direction of axis 78. Since the prism holding member 75 does not retreat in the direction of the first optical axis 76, a thickness of lens unit 12 does not grow greater. Further, since the prism holding member 75 does not retreat in the direction parallel to the second optical axis 77, it is not necessary to provide a complicated structure for causing the second lens group 82 to retreat, or for causing also the third lens group to retreat, for providing a space for retreating to the second lens group 82 side. It is further possible to make lens unit 12 small because it is not necessary to provide a space for the prism holding member 75 to retreat to the side that is opposite to the second lens group 82 about the first optical axis 76. Further, even if the position of the prism 85 shifts for taking an image, the relative relationship between the center axis of first lens group 81 and the center axis of the second lens group 82 hardly changes.

Further, as shown in FIG. 8, a tubular form of each of the first rectilinear tube 70 and the second rectilinear tube 71 is in a square form, and includes two pairs of planes facing each other across the first optical axis 76 (see FIGS. 8 and 9). One of the two pairs of the planes is almost perpendicular to axis 78. Therefore, the distance for the prism holding member 75 equipped with prism 85 to retreat to the position where the prism holding member does not interfere with the retracting first rectilinear tube 70 and the second rectilinear tube 71 can be make shorter, compared with, for example, a circular form. Therefore, a period of time necessary for housing (retracting) of an image taking lens and for starting can be shortened.

Next, with respect to the structure for movement for variable power of the second holding member 72, the first guide shaft 41 is arranged to be in parallel with the second optical axis 77 as shown in FIG. 1, and its both ends are fixed to the wall surfaces of casing 60. Further, the first guide shaft 41 engages with the first slide guiding hole 42 of the second holding member 72 representing a guide portion, and it guides the second holding member 72 so that it can be moved in the direction of the second optical axis 77 without being tilted away from the second optical axis 77. Rotation-stopper portion 72c is engaged with regulating section 60d of casing 60, so that a rotation of the second holding member 72 around the second optical axis 77 may be regulated when the second holding member 72 moves.

Further, the second holding member 72 is urged by a spring to the image pickup element 26 side in the second optical axis 77 direction by a spring (not shown), and a guide pin (not shown) of the second holding member 72 is in touch with cam displacement contact portion 45b provided on drive shaft 45a identical to drive shaft member 106 that reduces a rotation of the first motor 40 with reduction gear train 45 to rotate. Since the displacement contact portion 45b is constantly in contact with the guide pin (not shown), the second holding member 72 is moved for variable power by a rotation of the drive shaft 45a. In this way, the drive shaft 45a is a member to move the second holding member 72 for variable power, and it moves the first rectilinear tube 70 and the second rectilinear tube 71 in an interlocking way, as stated above.

Further, with respect to the structure of third holding member 73 concerning a movement for variable power, third guide shaft 61 is arranged to be in parallel with the second optical axis 77 as shown in FIG. 1, and its one end is fixed on wall surface 60e of casing 60, while, the other end thereof is fixed on central wall surface 60f. Third slide guiding hole 73a of the third holding member 73 is engaged with this third guide shaft 61 to guide the third holding member 73 so that it may move in the direction of the second optical axis 77 without tilting away from the second optical axis 77. Rotation-stopper portion 73c is engaged with regulating section 60c of casing 60 to avoid that the third holding member 73 rotates around the optical axis when the third holding member 73 moves. Third drive shaft 62 connected with a rotary shaft of third motor 63 is arranged to be in parallel with the second optical axis 77, and a spiral screw is formed on an outer circumferential surface of the third drive shaft 62. The spiral screw is screwed in engagement screw 73b connected to slide guiding portion 73a of the third holding member 73.

When the third motor 63 rotates, the third holding member 73 is moved by a lead of a screw of the third drive shaft 62 in the optical axis direction for focusing on image pickup element 26.

Second Embodiment

Next, the structure of lens unit 30 as the second embodiment will be explained. The lens unit 30 can be provided on digital camera 1 in the same way as in lens unit 12 of the first embodiment.

FIG. 11 is a front view of lens unit 30 at the wide-angle end. FIG. 12 is a side view of lens unit 30 at the wide-angle end. FIG. 13 is a side view of lens unit 30 at the telephoto end. Each of FIGS. 14(a) and 14(b) is a top view of lens unit 30 at the wide-angle end. FIG. 15 is a top view of lens unit 30 at the telephoto end. FIG. 16 is a diagram showing a primary portions wherein prism holding member 275 is retreated in a front view of the retracted condition. FIG. 17 is a side view of the retracted condition. FIG. 14(a) shows a moving mechanism for the first rectilinear tube 70 and the second rectilinear tube 71 and FIG. 14(b) shows mainly a moving mechanism for the prism. FIG. 19 is a perspective view showing schematically the neighborhood of a connecting member of a lens unit.

With respect to the side view, it does not illustrate the second and third lens groups, but it is used for explanation of the first lens group 81, the second rectilinear tube 271 causing a movable frame that holds the first lens group 81 and moves it, the first rectilinear tube 305 causing a movable frame that holds the second rectilinear tube 271 and moves it and of a movement of a member that drives the aforesaid rectilinear tubes. Incidentally, the members having the same functions as those in the first embodiment are given the same numbers. Lens unit 30 is equipped with casing 270 representing a stationary frame and with the first rectilinear tube 305 and the second rectilinear tube 271 each representing a movable frame.

Since an image taking lens owned by lens unit 30 is of the structure identical to that in the first embodiment, an explanation thereof will be omitted here.

The prism 85 is a triangular prism whose section is a rectangular equilateral triangle, in the same way as in the first embodiment, and its inclined surface is arranged so that it may form an angle of 45° with each of the first optical axis 76 and the second optical axis 77, and the first optical axis 76 is bent by about 90° toward the direction of the second optical axis 77, as shown in FIG. 12. By bending the optical axis such that the first optical axis 76 and the second optical axis 77 forms an angle about 90°, it is not necessary to align the first lens group 81, the second lens group 82 and the third lens group 83 in a straight line, which makes it possible to shorten a length of the first lens group 81 in its optical axis direction, or to thin the lens group. Therefore, the lens unit 12 can be thinned.

As shown in FIG. 11 and FIG. 12, the second rectilinear tube 271 holds the first lens group 81, prism holding member 275 holds prism 85 to form an optical-path bending member, the second holding member 272 holds the second lens group 82 and third holding member 273 holds third lens group 83. In the meanwhile, the alternative of prism 85 that bends an optical path may be a plate-shaped mirror, because it has only to be possible to deflect a light flux coming from an object efficiently and it is not limited to the prism. Camera-shake-correction unit 272t holds camera-shake-correction lens group 82t movably in the direction perpendicular to the second optical axis 77, and corrects displacement of an optical axis caused by camera-shake. A shutter unit (not shown) is fixed on the second holding member 272.

The structure for moving the first lens group 81 with varying power will be described. The second rectilinear tube 271 holding the first lens group 81 includes guide grooves 911 and 912 thereon, and the guide grooves 911 and 912 respectively engage with guide pins 300a and 300b provided with the drive arm 300. The second rectilinear tube 271 engages with first driven arm 301A for regulating the attitude of the second rectilinear tube 271 with the drive arm 300. The second rectilinear tube 271 includes guide pins 271a and 271b thereon, and the first driven arm 301A includes driven grooves 915a and 915b thereon. The guide pins 217a and 217b engage respectively with the driven grooves 915a and 915b. The first rectilinear tube 305 are arranged outside of the second rectilinear tube 271.

The second rectilinear tube 271 is formed by a frame body in a shape of a rectangular tube. Each of the drive arm 300 and the first driven arm 301A includes two arms arranged the both side of the optical axis 76. The drive arm 300 engages with the second rectilinear tube 271 at one end thereof and the drive arm 300 has drive arm shaft 30 which is a rotary shaft at the other end. The first driven arm 301A engages with the second rectilinear tube 271 at one end thereof and has a rotary shaft 301X at the other end thereof. By providing the almost U-shaped arms of the drive arm 300 and the first driven arm 301A which slidably move on the inner surface of the second rectilinear tube 271, the second rectilinear tube 271 moves along the optical axis 76 and regulates its attitude not to be rotated. When the drive arm 300 rotates on the drive arm shaft 303, the second rectilinear tube 271 transmits the rotation force from the guide pins 300a and 300b to the guide grooves 911 and 912, to change the rotation force into the force to make the second rectilinear tube 271 move linearly parallel to the optical axis 76.

Further, the first rectilinear tube 305 is formed by a frame body in a shape of a rectangular tube positioned outside of the second rectilinear tube 271. The second driven arm 305 engages with the first rectilinear tube 305 at one end thereof and has rotary shaft 301Y at the other end thereof. By providing the almost U-shaped arm of the second driven arm 301B having a structure so as to slidably move on the inner surface of the first rectilinear tube 305, the first rectilinear tube 305 moves along the optical axis 76, to regulate the attitude of the first rectilinear tube 305 not to be rotated. When the drive arm 300 rotates on the drive arm shaft 303, the first rectilinear tube 305 transmits the rotation force from the guide pins 300a and 300b to the guide groove 918, to change the rotation force into the force to make the first rectilinear tube 271 move linearly parallel to the optical axis 76. Namely, there is provided a structure that the guide pins 300a and 300b at the first connected portion of the drive arm 300 extends through the guide grooves 911, 912, 918, and 919 which are elongated holes on the second rectilinear tube 271 and the first rectilinear tube 305.

The rectilinear tube 305 moves straight along the optical axis 76 with the second rectilinear tube 271 on a position where the guide grooves 918 and 919 have a straight lined shape. The rectilinear tube 305 does not move and only the second rectilinear tube moves on a position where the guide grooves 918 and 919 have the circular arc portion around the drive arm shaft 303.

Figure 14:
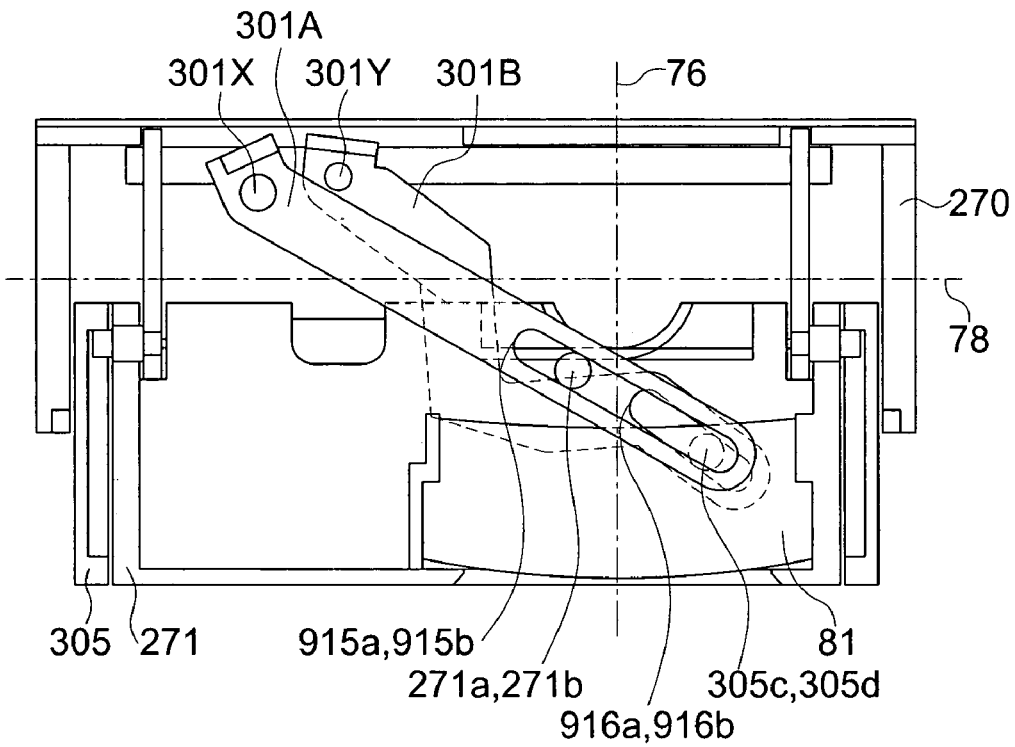
Figure 14:
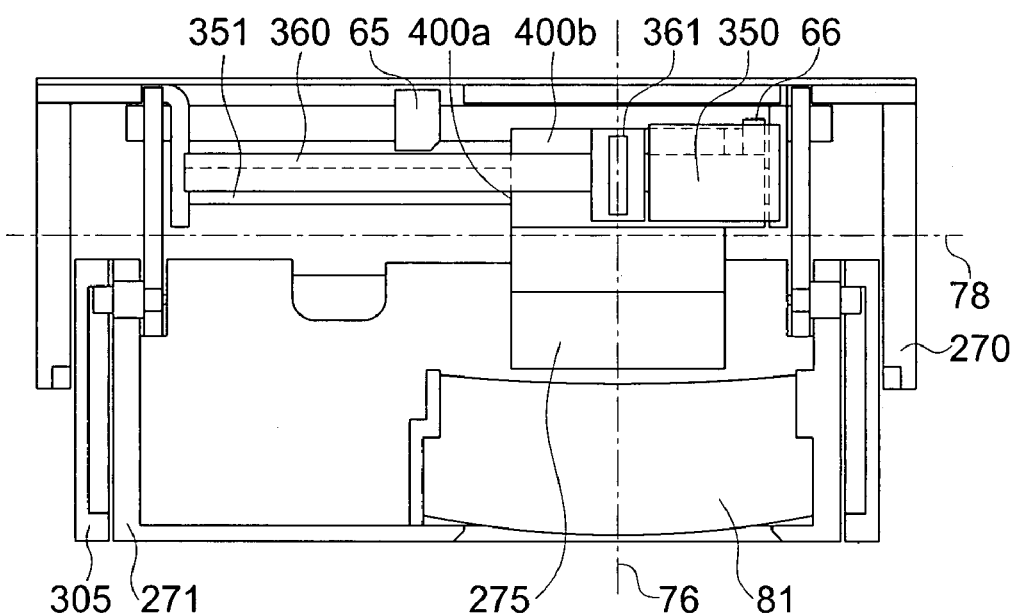

Movement of lens unit 30 from a wide-angle end shown in FIGS. 11, 12 and 14 to a telephoto end shown in FIGS. 13 and 15 will be explained.

Terminal gear 307 of reduction gear train (not shown) shown in FIG. 19 is driven by driving of first motor 304 shown in FIG. 11, and this driving power is transmitted to a gear portion in the circumference of connection plate 600 to rotate the connection plate 600 (see FIGS. 11 and 12). Together with a rotation of the connection plate 600, pin 601 provided on the surface outside the connection plate 600 is rotated, and drive arm 300 having elongated hole 800 that is engaged with the pin 601 is rotated (clockwise in FIG. 12) around drive arm shaft 303. As shown in FIG. 13, a rotation of the drive arm 300 transmits driving power to guide grooves 911 and 912 of the second rectilinear tube 271 engaging respectively with pin 300a and pin 300b provided on the drive arm 300. This driving power moves the second rectilinear tube 305 that holds the first lens group 81 in the direction of the first optical axis 76.

As shown in FIG. 13, the first rectilinear tube 305 moves together with the second rectilinear tube 271 and is moved to the object side by guide grooves 918 and 919 which engage respectively with pin 300a and pin 300b of the drive arm 300. In this case, the first rectilinear tube 305 stops at the position where each of pin 300a and pin 300b comes free from a straight portion of each of the guide grooves 918 and 919, and thereafter, only the second rectilinear tube 271 moves to the object side.

With a movement of the second rectilinear tube 271, pin 271a and pin 271b of the second rectilinear tube 271 are moved as shown respectively in FIGS. 14(a) and 14(b) and in FIG. 15. These pins 271a and 271b engages respectively with elongated holes 915a and 915b of the first driven arm 301A. Therefore, with a movement of the second rectilinear tube 305 moves 271, the first driven arm 301A supported on rotary shaft 301X is rotated. Further, with a movement of the first rectilinear tube 305, pin 305c and 305d of the first rectilinear tube 305 are moved. These pins 305c and 305d engages respectively with elongated holes 916a and 916b of the second driven arm 301B. Therefore, with a movement of the first rectilinear tube 305, the second driven arm 301B pivotally supported on rotary shaft-301Y is rotated.

By slidably moving an inner surface of the second rectilinear tube 271 on an outer surface of the first driven arm 301A, it is possible to move the second rectilinear tube 271 smoothly along the first optical axis 76, and by silidably moving an inner surface of the first rectilinear tube 305 on an outer surface of the second driven arm 301B, it is possible to move the first rectilinear tube 305 smoothly along the first optical axis 76, as stated above. Thereby, the first lens group reaches to a telephoto end from a wide-angle end.

Further, with a rotation of connection plate 600 shown in FIG. 19, pin 602 provided on the surface inside the connection plate 600 presses guide groove 701 of cam plate 700 of the second holding member 272. When the guide groove 701 is pressed, the second holding member 272 holding second lens group 82 is moved along the first guide shaft 320 whose both ends are fixed on casing 70 with wall surfaces 70d and 70e.

Next, in operations for variable power of third holding member 273 that holds third lens group 83, as shown in FIG. 1, when third motor 263 rotates from the wide-angle end, the lead of third drive shaft 262 causes the third holding member 273 to move straight to the image pickup element 26 side to arrive at the telephoto end, because third slide guiding hole 273a engages with third guide shaft 61 that is fixed on casing 270 at both wall surfaces 270f and 270g to be guided in the direction of the second optical axis 77.

Next, an explanation will be given about retracting. In the case of retracting, the second rectilinear tube 271 holding the first lens group 81 representing a movable frame and the first rectilinear tube 305 move to the prism inserting and removing position as shown in FIG. 12 and FIGS. 14(a) and 14(b).

The first lens group 81 that is held by the second rectilinear tube 71 is required to be set at positions where they do not interfere with the prism holding member 75 when it retreats in the direction of axis 78 (virtual axis) that is perpendicular to the first plane formed by the first optical axis 76 and the second optical axis 77. This position is assumed to be a prism inserting and removing position. Incidentally, this position may be determined properly by considering convenience for use of digital camera 1 equipped with lens unit 30.

Next, prism holding member 275 retreats in the direction of axis 78 that is substantially perpendicular to the first plane formed by the first optical axis 76 and the second optical axis 77, as shown in FIG. 16 and FIG. 18. An angle of the axis in the direction that is substantially perpendicular to the first plane is in a range of not more than 15°, under the condition that an angle of the axis perpendicular to the first plane is 0°. If the direction for the prism holding member 75 holding prism 85 to retract is made to be substantially perpendicular to the first plane, a distance for movement does not turn out to be too long, whereby it is possible to avoid interference with other mechanisms while attaining downsizing. Then, the second rectilinear tube 271 and the first rectilinear tube 305 travel along the first optical axis 76 to the space formed by the retreated prism 85 to be housed. The position to which the prism holding member 75 that holds the prism 85 has retreated in this case is assumed to be a retreating position. In the case of retracting, the second rectilinear tube 271, the first rectilinear tube 305 and the second holding member 272 move together.

As shown in FIG. 12, when the first motor 304 drives, drive arm 300 rotates around drive arm shaft 303, and the second rectilinear tube 271 travels to the position where the prism at wide-angle end (wide end) is inserted and removed. Then, prism holding member 275 holding prism 85 is caused to retreat to the retreating position.

A mechanism to retreat the prism holding member 275 to the retreating position will be explained as follows, referring to FIG. 11, FIG. 14(b) and FIG. 16. The prism holding member 275 that holds prism 85 has second slide guiding portion 400b representing a moving mechanism and second slide guiding hole 400a, and the second slide guiding hole 400a engages with second guide shaft 351 that is fixed on casing 270. On the prism holding member 275, there is provided a key (not shown) serving as a rotation-stopper, and this key engages with a key groove (not shown) that is in parallel with guide shaft 51 and is provided on the stationary frame. Further, the second slide guiding portion 400b is moved by a bending-member moving mechanism that is composed of the second drive shaft 360 provided with a male screw driven by second motor 350 and engagement screw 361 provided with a female screw that engages with this male screw 52.

As shown in FIG. 12, the second motor 350 is provided in a space positioned behind (on the side opposite of the object) a reflecting surface of prism 85 located at the optical path bending position. As shown in FIG. 11 and FIGS. 14(a) and 14(b), second slide guiding portion 400b is moved by rotation of the second motor 350, and prism holding member 275 connected to the second slide guiding portion 400b is moved along the second guide shaft 351 to retreat to the retreating position shown in FIG. 16. In this case, the key of the prism holding member 275 slides in the key groove provided on a stationary frame. By moving the prism holding member 275 linearly to retreat, a space needed for retreating can be made small, which, therefore, makes casing 270 representing a stationary frame housing therein lens unit 30 to be small.

As a moving mechanism for moving prism 85 linearly in the present embodiment, the second drive shaft 360 and the engagement screw 55 are used. However, it is possible to use, without being limited to the foregoing, the linear actuator such a, for example, a linear motor and SIDM and a link mechanism such as a rack/pinion and a pantograph mechanism.

It is preferable that the aforesaid moving mechanism for moving prism 85 is provided in the space formed by the surface including a reflecting surface of prism 85 held by prism holding member 275, an upper surface of stationary frame 270, and an end surface of the stationary frame 270 positioned to be opposite to the object, in other words, the space formed by a surface including a reflection surface of the optical-path bending member and an inner surface of the stationary frame positioned opposite to the object side across the optical path bending member. By providing the moving mechanism in this space, lens unit 30 can be made small because a space inside the casing 270 can be utilized effectively.

After that, first motor 304 drives, and the second rectilinear tube 271 and the first rectilinear tube 305 are moved to retracting positions (see FIGS. 17 and 18) by rotation of drive arm 300, thus, retracting operations are completed.

In the case of raising, operations are made in the order opposite to that in the retracing operations. Namely, the second rectilinear tube 271 and the first rectilinear tube 305 are moved to the wide-angle end. After that, the prism holding member 275 is moved to an optical path bending position. Owing to this, the lens unit 30 becomes ready for taking an image.

For the purpose of moving prism holding member 275 to the retreating position and to the optical path bending position for positioning, a position sensor and photo-interrupter 65 are provided at each of the retreating position and the optical path bending position on the casing 270, and the prism holding member 275 is provided with light-shielding plate 66 that intercepts an optical path for detection provided on the photo-interrupter 65.

When this light-shielding plate 66 intercepts an optical path of photo-interrupter 65 provided at the retreating position, for example, controller 27 detects the interception of the optical path and stops the second motor 350, whereby, the prism holding member 275 is stopped at the retreating position accurately. This also applies equally to the optical path bending position. The position for providing this light-shielding plate is not limited to the prism holding member 75, and it has only to be one that moves linearly equally to prism 85 with a movement of the prism 85, exemplifying, for example, the second slide guiding portion 400b.

The prism holding member 275 that holds prism 85 is retreated linearly in the direction of axis 78 as stated above. Since the prism holding member 275 does not retreat in the direction of the first optical axis 76 as shown in FIG. 18, a thickness of lens unit 12 does not grow greater. Further, since prism holding member 275 does not retreat in the direction that is in parallel with the second optical axis 77 as shown in FIG. 16, it is not necessary to provide complicated structures to cause the second lens group 82 and to cause, according to circumstances, the third lens group to retreat for providing a space for retreating to the second lens group 82 side. It is further possible to make the lens unit 30 to be small because it is not necessary to provide a space for the prism holding member 275 to retreat to the side that is opposite to that of the second lens group 82 about the first optical axis 76.

Each of the second rectilinear tube 271 and the first rectilinear tube 305 has a shape of a rectangular tube. Further, a size in each of the second rectilinear tube 271 and the first rectilinear tube 305 is made to be one wherein the prism 85 in the case of retreating can be housed inside. In the case of retracing, prism holding member 275 that holds the prism 85 under the state of retreating is inside the second rectilinear tube 271 under the condition that it is side-by-side with the first lens group. By making the retreated prism holding member 275 to be housed inside the second rectilinear tube 271, prism 85 can move between the retreating position and the optical path bending position, when at least the first lens group 81 held by the second rectilinear tube 271 is not interfered.

It is further possible to shorten the distance for the prism holding member 275 to move for retreating by a distance equivalent to the total thickness for the second rectilinear tube 271 and the first rectilinear tube 305. Therefore, it is possible to shorten the operation time for raising and for retracting for better usability, and to make lens unit 30 to be smaller. Further, by providing the second motor 350 on the rear side of a reflecting surface of prism 85 located at the optical path bending position, a space in casing 270 can be utilized effectively, whereby, the lens unit 30 can be made smaller.

Next, with respect to the structure for movement for varying power of the second holding member 272, the first guide shaft 320 is arranged to be in parallel with the second optical axis 77 as shown in FIG. 11, and its both ends are fixed to the wall surfaces 270*d* and 270*e* of casing 270. Further, the first guide shaft 320 engages with the first slide guiding hole 272*a* of the second holding member 272 representing a guide portion, and it guides the second holding member 272 so that it can be moved in the direction of the second optical axis 77. In this case, a rotation of the second holding member 272 is regulated by the third guide shaft 261 serving also as a rotation-stopper shaft and by sliding portion 272*b*.

Further, the second holding member 272 is equipped with cam plate 700, and the cam plate 700 is equipped with guide groove 501 that engages with guide pin 602 formed on the inside surface of connection plate 600. A rotation of the connection plate 600 causes the second holding member 272 to move for varying power through the pin 602 and guide groove 501.

As stated above, a connected portion between the pin 601 formed on a surface on one side of the connection plate 600 and the guide groove 800 of the first rectilinear tube 271 and a connected portion between pin 602 formed on the surface on the other side and guide groove 501 of the second holding member 272 move the first rectilinear tube 271 and the second holding member 272 together.

Further, with respect to the structure of third holding member 273 concerning a movement for varying power, third guide shaft 261 is arranged to be in parallel with the second optical axis 77 as shown in FIG. 11, and its one end is fixed on wall surface 270*g* of casing 270, while, the other end thereof is fixed on central wall surface 270*f*. Third slide guiding hole 273*a* of the third holding member 273 is engaged with this third guide shaft 261 to guide the third holding member 273 so that it may move in the direction of the second optical axis 77 without tilting away from the second optical axis 77. Third drive shaft 62 connected with a rotary shaft of third motor 263 is arranged to be in parallel with the second optical axis 77, and a spiral screw is formed on an outer circumferential surface of the third drive shaft 62. The spiral screw is screwed in engagement screw 73*b* of the third holding member 273. Rotation-stopper shaft 264 is fixed on wall surfaces 273*g* and 273*h* of the casing 270 to regulate the third holding member 273 together with rotation-stopper portion 273*d*, and the third holding member 273 is guided in the direction of the second optical axis 77.

When the third motor 63 rotates, a lead of the screw of the third drive shaft 62 causes the third holding member 273 to move along the second optical axis direction 77 for focusing on image pickup element 26.

According to the first and second embodiments relating to the invention, an optical-path bending member moves linearly in the direction substantially perpendicular to a first surface formed by an optical axis of a front lens group and that of a rear lens group to retreat when an image is not taken. It is therefore possible to make a length of the rear lens group in the optical axis direction to be short, because it is not necessary to provide a space for the optical-path bending member to retreat in the optical axis direction of the rear lens group. It is further possible to make a length of the front lens group in the optical axis direction to be short (thin), because it is not necessary to provide a space for the optical path-bending member to retreat in the optical axis direction of the front lens group. Further, it is possible to make a structure to be simple because it is not necessary to retreat the rear lens group for the purpose of retreating the optical-path bending member. Further, a space necessary for retreating can be made small, because the optical path-bending member moves linearly to retreat.

It is therefore possible to provide a small lens unit with a simple structure in which an image taking lens can be housed when an image is not taken.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

In the first and second embodiments stated above, a retreating position for each of prism holding members 75 and 275 is on the left side of a page space on each of FIG. 1 and FIG. 11 when the page space is viewed downward perpendicularly. However, it is naturally possible to employ the structure wherein the retreating position is on the right side.

What is claimed is:

1. A lens unit comprising:
   a first lens group arranged on a first optical axis, in which a light flux from an object enters the first lens group along the first optical axis;
   a second lens group arranged on a second optical axis;
   an optical-path bending member having a reflection surface for bending the light flux along the first optical axis in a first direction along the second optical axis;
   a movable frame holding the first lens group;
   a stationary frame holding the movable frame movably in a second direction along the first optical axis, and adopted to telescopically house the movable frame therein; and
   a bending-member moving mechanism for moving the optical-path bending member,
   wherein when an image is taken, the movable frame protrudes from the stationary frame and the optical-path bending member is arranged at a position so as to bend the light flux along the first optical axis in the first direction along the second optical axis,
   when the lens unit retracts fully, the bending-member moving mechanism moves the optical-path bending member in a direction substantially perpendicular to a plane to retreat the optical-path bending member from an area where the first lens group is to be housed in the stationary frame, where the plane is formed by the first optical axis and the second optical axis, and the movable frame is in a shape such that the movable frame houses the retreated optical-path bending member when the lens unit retracts fully.

2. The lens unit of claim 1, wherein the movable frame is in a shape of a rectangular tube.

3. The lens unit of claim 1, wherein the bending-member moving mechanism is arranged in a space formed by a surface including the reflection surface and a portion of an inner surface of the stationary frame, the portion being positioned at an opposite side of the object across the optical-path bending member.

4. A lens unit comprising:

a first lens group arranged on a first optical axis, in which a light flux from an object enters the first lens group along the first optical axis;

a second lens group arranged on a second optical axis that is substantially perpendicular to the first optical axis and wherein the first optical axis and the second optical axis both are entirely contained in a common plane;

an optical-path bending member having a reflection surface for bending the light flux along the first optical axis in a first direction along the second optical axis;

a movable frame holding the first lens group;

a stationary frame holding the movable frame movably in a second direction along the first optical axis, and adopted to telescopically house the movable frame therein; and a bending-member moving mechanism for moving the optical-path bending member, wherein when an image is taken, the movable frame protrudes from the stationary frame and the optical-path bending member is arranged at a position so as to bend the light flux along the first optical axis in the first direction of along the second optical axis, and when the lens unit retracts, the bending-member moving mechanism moves the optical-path bending member in a third direction substantially perpendicular to the common plane to retreat the optical-path bending member from an area where the first lens group is to be housed in the stationary frame, and wherein the bending-member moving mechanism is arranged in a space formed by:

a second plane including the reflection surface, and a portion of an inner surface of the stationary frame, the portion being positioned at an opposite side of the object across the optical-path bending member.

5. The lens unit of claim 4, wherein the movable frame is in a shape of a rectangular tube.

6. A lens unit comprising:

a first lens group arranged on a first optical axis, in which a light flux from an object enters the first lens group along the first optical axis;

a second lens group arranged on a second optical axis;

an optical-path bending member having a reflection surface for bending the light flux along the first optical axis in a first direction along the second optical axis;

a movable frame holding the first lens group, and having a tube shape comprising a side plane parallel to a first plane formed by the first optical axis and the second optical axis;

a stationary frame holding the movable frame movably in a second direction along the first optical axis, and adopted to telescopically house the movable frame therein; and a bending-member moving mechanism for moving the optical-path bending member, wherein when an image is taken, the movable frame protrudes from the stationary frame and the optical-path bending member is arranged at a position so as to bend the light flux along the first optical axis in the first direction along the second optical axis, and when the lens unit retracts, the bending-member moving mechanism moves the optical-path bending member in a third direction substantially perpendicular to the first plane to retreat the optical-path bending member from an area where the first lens group to be housed in the stationary frame, and wherein:

the movable frame is in a shape of a rectangular tube, the movable frame comprises a first movable frame unit and a second movable frame unit, the second movable frame unit holds the first lens group, the first movable frame unit holds the second movable frame unit such that the second movable frame unit can move in and out from the first movable frame unit, the lens unit further comprises a movable-frame drive mechanism for driving the movable frame in the second direction along the first optical axis, the movable-frame drive mechanism comprising:

a first drive member comprising a first set of two arms arranged at both sides of the first optical axis, and a first rotary shaft arranged at one end of the first set of two arms and supported by the stationary frame, the first set of two arms being engaged with the first movable frame unit at another end of the first set of two arms, and a second drive member comprising a second set of two arms arranged at both sides of the first optical axis, and a second rotary shaft arranged at one end of the second set of two arms, the second set of two arms being engaged with the second movable frame unit at another end of the second set of two arms and engaged with the first drive member and the first movable frame unit between the one end and the another end of the second set of two arms and wherein the first rotary shaft and the second rotary shaft are perpendicular to the first optical axis.

7. The lens unit of claim 6, wherein the movable-frame drive mechanism further comprises:

a first driven member comprising a third set of two arms arranged at both sides of the first optical axis, and a third rotary shaft arranged at one end of the third set of two arms and supported by the stationary frame, the third set of two arms being engaged with the first movable frame unit at another end of the third set of two arms, and a second driven member comprising a fourth set of two arms arranged at both sides of the first optical axis, and a fourth rotary shaft arranged at one end of the fourth set of two arms and supported by the first movable frame unit, the fourth set of two arms being engaged with the second movable frame unit at another end of the fourth set of two arms, and wherein the third rotary shaft and the fourth rotary shaft are perpendicular to the first optical axis, the first rotary shaft and the third rotary shaft are perpendicular to each other, and the second rotary shaft and the fourth rotary shaft are perpendicular to each other.

8. The lens unit of claim 7, wherein when the second movable frame unit moves along the second direction along the first optical axis, the third set of two arms of the first driven member are slidably moved on the second movable frame unit.

9. The lens unit of claim 7, wherein when the second movable frame unit moves along the second direction along the first optical axis, the fourth set of two arms of the second driven member are slidably moved on the second movable frame unit.

10. The lens unit of claim 6, wherein the first movable frame unit is engaged with the first drive member and the second drive member through an elongated hole and a pin.

11. A lens unit comprising:
a first lens group arranged on a first optical axis, in which a light flux from an object enters the first lens group along the first optical axis;
a second lens group arranged on a second optical axis;
an optical-path bending member having a reflection surface for bending the light flux along the first optical axis in a first direction along the second optical axis;
a movable frame holding the first lens group, and having a tube shape comprising a side plane parallel to a first plane formed by the first optical axis and the second optical axis;
a stationary frame holding the movable frame movably in a second direction along the first optical axis, and adopted to telescopically house the movable frame therein; and
a bending-member moving mechanism for moving the optical-path bending member,
wherein when an image is taken, the movable frame protrudes from the stationary frame and the optical-path bending member is arranged at a position so as to bend the light flux along the first optical axis in the first direction of the second optical axis, and
when the lens unit retracts, the bending-member moving mechanism moves the optical-path bending member in a direction substantially perpendicular to the first plane to retreat the optical-path bending member from an area where the first lens group to be housed in the stationary frame,
wherein:
the movable frame is in a shape of a rectangular tube,
the movable frame comprises a first movable frame unit and a second movable frame unit,
the second movable frame unit holds the first lens group,
the first movable frame unit holds the second movable frame unit such that the second movable frame unit can move in and out from the first movable frame unit,
the lens unit further comprises a movable-frame drive mechanism for driving the movable frame in the second direction along the first optical axis, the movable-frame drive mechanism comprising:
a first drive member comprising a set of two arms arranged at both sides of the first optical axis, and a first rotary shaft at one end of the set of two arms, the set of two arms being engaged with the first movable frame unit and the second movable frame unit at another end of the set of two arms, and wherein the first rotary shaft is perpendicular to the first optical axis, each of the set of two arms comprises a pin at the one end of the set of two arms, and the pin is engaged with an elongated hole arranged on each of the first movable frame unit and the second movable frame unit.

12. The lens unit of claim 11, wherein the movable-frame drive mechanism further comprises:
a first driven member comprising a second set two arms arranged at both sides of the first optical axis, and a second rotary shaft at one end of the second set of two arms, the second set of two arms being engaged with the second movable frame unit at another end of the second set of two arms, and
a second driven member comprising a third set of two arms arranged at both sides of the first optical axis, and a third rotary shaft at one end of the third set of two arms, the third set of two arms being engaged with the first movable frame unit at another end of the third set of two arms, and
wherein the second rotary shaft and the third rotary shaft are perpendicular to the first optical axis, the first rotary shaft and the second rotary shaft are perpendicular to each other, and the first rotary shaft and the third rotary shaft are perpendicular to each other.

13. The lens unit of claim 12, wherein when the second movable frame unit moves along the second direction along the first optical axis, the second set of two arms of the first driven member are slidably moved on the second movable frame unit.

14. The lens unit of claim 12, wherein when the first movable frame moves along the second direction along the first optical axis, the third set of two arms of the second driven member are slidably moved on the first movable frame unit.

15. An image pickup apparatus comprising:
a light detector that receives light from a lens unit and forms an image from the light;
the lens unit of comprising:
a first lens group arranged on a first optical axis, in which a light flux from an object enters the first lens group along the first optical axis;
a second lens group arranged on a second optical axis that is substantially perpendicular to the first optical axis and wherein the first optical axis and the second optical axis both are entirely contained in a common plane;
an optical-path bending member having a reflection surface for bending the light flux along the first optical axis in a first direction along the second optical axis;
a movable frame holding the first lens group;
a stationary frame holding the movable frame movably in a second direction along the first optical axis, and adopted to telescopically house the movable frame therein; and
a bending-member moving mechanism for moving the optical-path bending member,
wherein when an image is taken, the movable frame protrudes from the stationary frame and the optical-path bending member is arranged at a position so as to bend the light flux along the first optical axis in the first direction along the second optical axis and
when the lens unit retracts, the bending-member moving mechanism moves the optical-path bending member in a third direction substantially perpendicular to the common plane to retreat the optical-path bending member from an area where the first lens group is to be housed in the stationary frame, and
wherein the bending-member moving mechanism is arranged in a space formed by:
a second plane including the reflection surface, and
a portion of an inner surface of the stationary frame, the portion being positioned at an opposite side of the object across the optical-path bending member.

* * * * *